(12) United States Patent
Roney et al.

(10) Patent No.: US 10,909,305 B2
(45) Date of Patent: Feb. 2, 2021

(54) DOCUMENT CREATION FROM AN ELECTRONIC MAIL (E-MAIL) SYSTEM

(71) Applicant: Microsoft Technology Licensing, LLC, Redmond, WA (US)

(72) Inventors: Brian Paul Roney, West Fargo, ND (US); Jared Coleman Hall, Fargo, ND (US); Chad David Sogge, Barnesville, MN (US); Zechariah William Andersen, Oxbow, ND (US); Adam Paul Helsene, Fargo, ND (US); Lisa Ann Christianson, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 15/963,272

(22) Filed: Apr. 26, 2018

(65) Prior Publication Data
US 2019/0332646 A1    Oct. 31, 2019

(51) Int. Cl.
  *G06F 40/14*    (2020.01)
  *H04L 12/58*    (2006.01)
  *G06F 40/205*   (2020.01)

(52) U.S. Cl.
  CPC .......... *G06F 40/14* (2020.01); *G06F 40/205* (2020.01); *H04L 51/22* (2013.01)

(58) Field of Classification Search
  CPC .... G06F 17/2247; G06F 40/14; G06F 40/205; H04L 51/22
  USPC ...................................................... 715/234
  See application file for complete search history.

(56) References Cited

U.S. PATENT DOCUMENTS

| | | | |
|---|---|---|---|
| 8,370,437 | B2 | 2/2013 | Duffek et al. |
| 9,911,089 | B2 | 3/2018 | Saiu et al. |
| 10,235,711 | B1* | 3/2019 | Koduvayur Viswanathan ............ G06Q 30/0623 |
| 2005/0228790 | A1* | 10/2005 | Ronnewinkel .......... G06F 16/35 |
| 2006/0167857 | A1* | 7/2006 | Kraft ..................... G06Q 10/10 |
| 2013/0117055 | A1 | 5/2013 | Abdic et al. |
| 2015/0058161 | A1 | 2/2015 | Gura et al. |
| 2015/0195227 | A1 | 7/2015 | Kassemi et al. |
| 2016/0323224 | A1* | 11/2016 | Stein ....................... G06F 40/18 |
| 2017/0041270 | A1 | 2/2017 | Gubbala et al. |
| 2017/0147979 | A1 | 5/2017 | Brady et al. |
| 2018/0268461 | A1* | 9/2018 | Hoag ................. G06Q 30/0635 |
| 2019/0197189 | A1* | 6/2019 | Studnicka ........... G06F 16/3334 |

OTHER PUBLICATIONS

Kosiba, David A., and Rangachar Kasturi. "Automatic invoice interpretation: invoice structure analysis." In Proceedings of 13th International Conference on Pattern Recognition, vol. 3, pp. 721-725. IEEE, 1996. (Year: 1996).*
"Create Salesforce Leads from any Gmail Email", Retrieved From: <<https://zapier.com/apps/gmail/integrations/salesforce/345/create-salesforce-leads-from-any-gmail-email>>, Retrieved Date: Mar. 7, 2018, 3 Pages.

* cited by examiner

*Primary Examiner* — Frank D Mills
(74) *Attorney, Agent, or Firm* — Christopher J. Volkmann; Kelly, Holt & Christenson, PLLC

(57) ABSTRACT

A document processing system receives a body of an e-mail message from an extension in an e-mail system and parses it to identify items that are to be included in a document created within the document processing system. The document processing system creates a document and populates it with the items identified in the body of the e-mail message and returns the created document to the extension in the e-mail system for interaction by a user.

18 Claims, 24 Drawing Sheets

I would like a quote for five of your London Swivel Chairs and 2 Athens Desks.

FIG. 6A

I would like a quote for [five] of your London Swivel Chairs and [2] Athens Desks.
                              388                                          390

FIG. 6B

I would like a quote for [five] of your London Swivel Chairs and [2] Athens Desks.
                              388                                          390
⎣____408____⎦        ⎣_____410_____⎦  ⎣__412__⎦

Search strings for search phrase 408:
- would like quote (408)
- like qoute (424)
- would like (426)
- would (428)
- like (430)
- quote (432)

Item Catalog (Searchable Data 188):
- Antwerp table (434)
- Athens Desk (436)
- Rome Guest Chair (438)
- London Swivel Chair (440)
- Istanbul Coffee Table (442)

FIG. 8

Search strings for search phrase 410:
- your London Swivel Chair (410)
- London Swivel Chair (446)
- your London Swivel (448)
- Swivel Chair (450)
- your London (452)
- your (454)

Item Catalog (Searchable Data 188):
- Antwerp table (434)
- Athens Desk (436)
- Rome Guest Chair (438)
- London Swivel Chair (440)
- Istanbul Swivel Chair (442)

DOCUMENT CREATION FROM AN ELECTRONIC MAIL (E-MAIL) SYSTEM

BACKGROUND

Computing systems are currently in wide use. Some computing systems include electronic mail (e-mail) systems which allow a user to perform e-mail operations. Such operations can include, for instance, authoring, sending and responding to e-mail messages, reading e-mail messages, sending attachments to e-mail messages, organizing folders, among a wide variety of other e-mail operations.

Other computing systems can include systems that host a document processing service. Some such systems allow a user to create different types of documents for a wide variety of different purposes. For instance, such systems can allow a user to create and manage word processing documents, spreadsheets, slide presentation documents, architectural documents, quotes for services or products, among a wide variety of other different types of documents.

It is not uncommon for an e-mail user to receive an e-mail message and then to create a document, within a document processing system, based on information contained in the e-mail message. Thus, some current e-mail systems include add-ins (or extensions). Add-ins (or extensions) are programs that can be added within the e-mail system. In one example, an extension or add-in is a program that is run within an e-mail system and that allows a user to access the document processing system from within the e-mail system, even while an e-mail message is displayed.

The discussion above is merely provided for general background information and is not intended to be used as an aid in determining the scope of the claimed subject matter.

SUMMARY

A document processing system receives a body of an e-mail message from an extension in an e-mail system and parses it to identify items that are to be included in a document created within the document processing system. The document processing system creates a document and populates it with the items identified in the body of the e-mail message and returns the created document to the extension in the e-mail system for interaction by a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6A-6C show examples of how items are identified in a text string.

FIGS. 7-11 show examples of identifying matched items from records in a data store.

DETAILED DESCRIPTION

Figure 1:
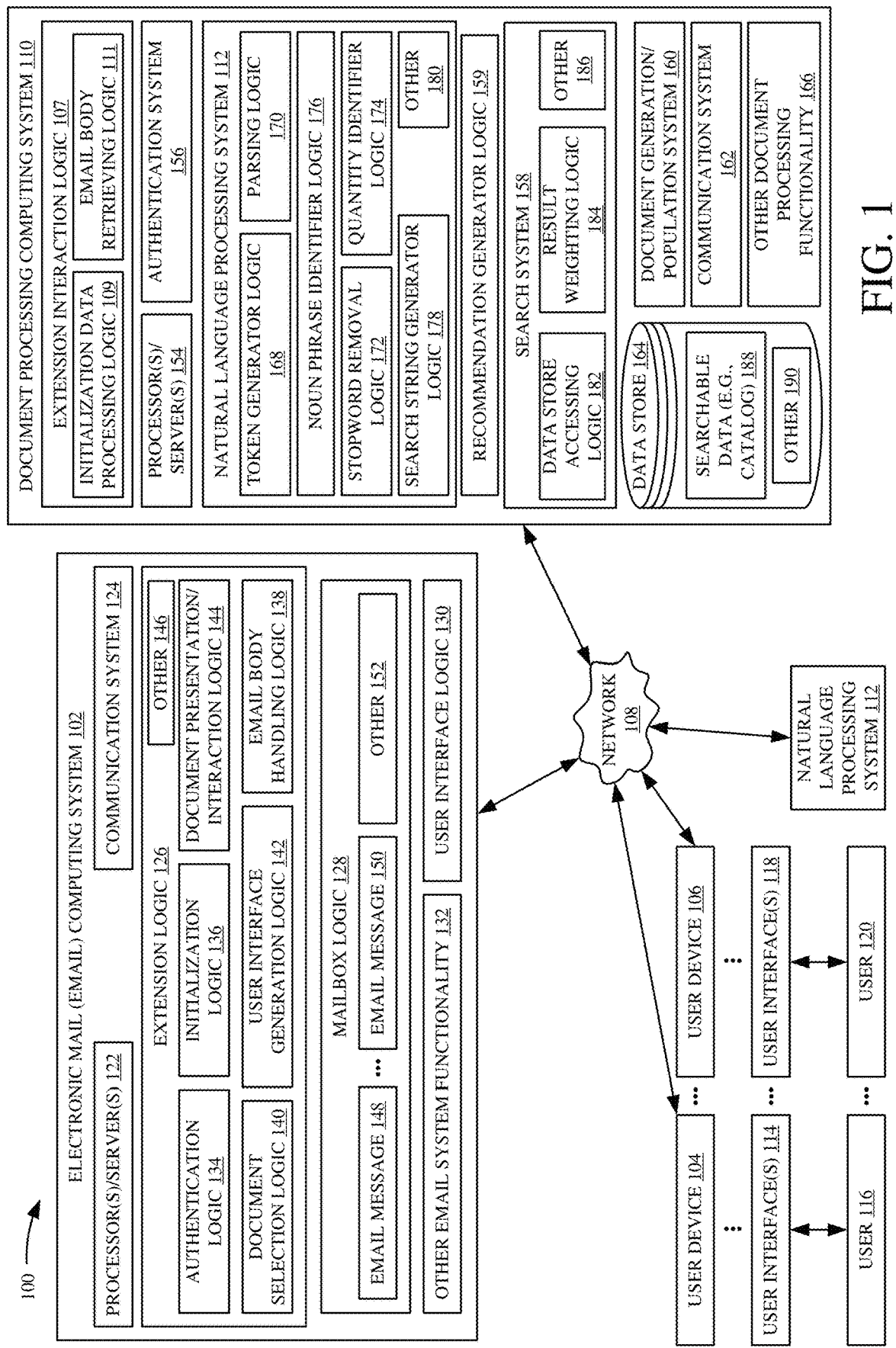
FIG. 1 is a block diagram of one example of a computing system architecture that includes an electronic mail (e-mail) computing system and a document processing computing system.

FIG. 1 is a block diagram showing one example of a computing system architecture 100. Architecture 100 illustratively includes an electronic mail (e-mail) computing system 102 that can be accessed by a plurality of different user devices 104-106 over a network 108. FIG. 1 also shows that architecture 100 illustratively includes a document processing computing system 110 that can be accessed by e-mail computing system 102, also over network 108. FIG. 1 shows that natural language processing system 112 (described in more detail below) may also be external to both of systems 102 and 110, in one example. In addition, FIG. 1 shows that user device 104 illustratively generates user interfaces 114 for interaction by user 116. User 116 thus interacts with user interfaces 114 in order to control and manipulate user device 104 and certain portions of e-mail system 102 and document processing computing system 110. Similarly, user device 106 illustratively generates user interfaces 118 for interaction by user 120. User 120 illustratively interacts with user interfaces 118 in order to control and manipulate user device 106 and some portions of systems 102 and 110 as well.

By way of overview, a user (such as user 116) may view an e-mail message received through e-mail computing system 102. Based on the body of that e-mail message, user 116 may wish to create a document within document processing computing system 110. Thus, in one example, user 116 can actuate an extension (or add-in) in e-mail computing system 102 to gain access to document processing computing system 110. Document processing computing system 110 can obtain the body of the e-mail message that is currently being viewed by user 116 and perform natural language processing on it to identify items that the user may wish to include in the document that is to be created within document processing computing system 110. It can then automatically create the document and populate it with the identified items and return the document, already populated, to the extension in e-mail computing system 102, where it can be displayed to the user. The user can then e-mail the document to another user, without having to separately create the document within document processing computing system 110, and without having to populate the created document with the items from the body of the e-mail message.

As a specific example, assume that document processing computing system 110 is an enterprise computing system that a user 116 uses to create documents such as quotes, purchase orders, etc. Assume further that user 116 receives an e-mail message from user 120, where user 120 wishes to get a quote for a plurality of items that are sold by the organization using document processing computing system 110. When that occurs, user 116 can open and view that e-mail message, which lists the items that user 120 wishes to order. User 116 can then actuate an extension in e-mail computing system 102, that connects the user 116 to document processing computing system 110. Document processing computing system 110 can then obtain the body of the e-mail message that user 116 is viewing and automatically identify the items to be quoted, and create a quote document that is pre-populated with the items for which user 120 wishes to receive a quote. It can then return the quote document to the e-mail system 102, through the extension, so that it can be reviewed by user 116 and forwarded on to user 120. When this occurs, the extension sends an indication, that the order has been e-mailed to user 120, back to document processing computing system 110, so that the records corresponding to the created quote document can be updated to show that it was e-mailed to user 120. In another example, the items identified in the body of the e-mail message can be surfaced for approval by user 116 before they are included in the document. Other variations are contemplated herein as well.

Before describing the overall operation of architecture 100 in more detail, a brief description of some of the items in architecture 100, and their operation, will first be provided.

E-mail computing system 102 illustratively includes one or more processors or servers 122, communication system 124, extension logic 126, mailbox logic 128, user interface logic 130, and it can include a wide variety of other e-mail system functionality 132. Extension logic 126, itself, illustratively includes authentication logic 134, initialization logic 136, e-mail body handling logic 138, document selection logic 140, user interface generation logic 142, document presentation/interaction logic 144, and it can include other items 146. Mailbox logic 128, itself, illustratively includes logic for displaying e-mail messages 148-150, and it can include a wide variety of other functionality 152 that allows the user to perform operations within his or her mailbox on e-mail computing system 102. Such operations can include, for instance, reading e-mail messages 148-150, responding to them, navigating among various folders, activating a set of extension logic (such as logic 126), etc.

Communication system 124 illustratively allows system 102 to communicate with other items both within system 102, and over network 108. Network 108 can be a wide area network, a local area network, a near field communication network, a cellular communication network, or any other of a wide variety of different types of networks or combinations of networks. Therefore, communication system 124 is configured to allow system 102 to communicate over those networks or combinations of networks.

Extension logic 126 is illustratively an extension (or add-in) that can be activated by user 116 to run within e-mail computing system 102. The extension logic 126 illustratively allows the user to access an external computing system (such as document processing computing system 110) from within e-mail computing system 102, and without needing to separately navigate to document processing computing system 110. Thus, authentication logic 134 illustratively authenticates the extension logic 126 to document processing computing system 110, when it is activated by user 116. Initialization logic 136 illustratively sends initialization data to document processing computing system 110. By way of example, when user 116 is viewing an e-mail message 148 and activates the extension logic 126, then initialization logic 136 may obtain the sender of the e-mail message being viewed by user 116, the sender's name, or other initialization information. Document selection logic 140 illustratively generates one or more document selection actuators that allow user 116 to select the type of document that user 116 wishes to be created within document processing computing system 110. When this happens, e-mail body handling logic 138 illustratively captures the body of the e-mail message being viewed by user 116 so that it can be sent to document processing computing system 110 for processing. As discussed in greater detail below, document processing computing system 110 parses the body of the e-mail message to identify items that are to be included in the document, sends them to e-mail system 102 for approval by user 116, creates the document, populates it with those items, and returns the populated document to e-mail computing system 102. Document presentation/interaction logic 144 illustratively uses user interface generation logic 142 to generate a user interface display so the document (or an overview or other representation of the document) can be displayed to user 116. The user interface display may illustratively include actuators that allow the user 116 to perform operations on the displayed document, to e-mail the displayed document to user 120 (or a different user) or to perform other operations.

FIG. 1 also shows that, in the example illustrated, document processing computing system 110 illustratively includes one or more processors or servers 154, extension interaction logic 107 (which, itself, includes initialization data processing logic 109 and e-mail body retrieval (logic 111), authentication system 156, natural language processing system 112 (which may be external to system 110, and accessed by system 110, such as over network 108 or internal to computing system 110). For the purposes of the present description, it will be assumed that natural language processing system 112 is internal to document processing computing system 110.

Document processing computing system 110 can also include search system 158, document generation/population system 160, communication system 162, data store 164, and it can include a wide variety of other document processing functionality 166. Natural language processing system 112 can include token generator logic 168, parsing logic 170, stop word removal logic 172, quantity reference identifier logic 174, noun phrase identifier logic 176, search string generator logic 178, and it can include a wide variety of other items 180. Search system 158, itself, can include data store accessing logic 182, result weighting logic 184, and it can include other items 186.

Data store 164 can include searchable data records 188, and a wide variety of other data records 190. For purposes of the present discussion, it will be assumed that searchable data records 188 are a product catalog with entries or records representing each item (or product). The records can include a product name, a product description, a product number, etc. Extension interaction logic 107 illustratively handles some or all interactions with extension logic 126. Interactions can also be direct with various components. Both are contemplated herein.

Authentication system 156 illustratively receives a call from extension logic 126 in e-mail computing system 102 and authenticates the extension logic (or add-in) 126. Initialization data processing logic 109 receives and processes initialization data, as discussed below. Natural language processing system 112 illustratively receives the body of an e-mail message, from e-mail body retrieval logic 111 when it is time, and parses it to identify items in the body of the e-mail message that are to be included in a document that will be created within document processing computing system 110. Thus, in one example, token generator logic 168 tokenizes the body of the e-mail (such as by using a word breaker to break the body of the e-mail into word-based tokens, or otherwise). Quantity identifier logic 174 identifies quantity references in the body of the e-mail (such as decimal or word-based numeric references), and stop word removal logic 172 removes stop words (such as articles, words with fewer than a threshold number of characters—e.g., fewer than four characters—a predefined list of stop words, etc.). Parsing logic 170 then identifies a certain number of tokens that precede a numeric reference, and a certain number of tokens that come after that numeric reference in the body of the e-mail message, once the stop words have been removed. Noun phrase identifier logic 176 identifies noun phrases in the body of the e-mail message. Search string generator logic 178 then generates search strings from the various strings of tokens that are identified by parsing logic 170 and from the noun phrases identified by noun phrase identifier logic 176.

Search system 158 then uses data store accessing logic 182 to search the searchable data 188 in data store 164 based upon the search strings that are generated by search sting generator logic 178. Data store accessing logic 182 identifies matching data store records in the searchable data 188 based upon those search strings. Result weighting logic 184 weights the search results (e.g., the matching records) based on various different strength criteria, to identify a set of strongest matches (or a highest weighted match). Recommendation generator logic 159 then generates a recommendation, identifying items corresponding to the strongest matches in the search results, and uses extension interaction logic 107 to send the recommendation to logic extension 126 where user interface generator logic 142 generates a representation of a user interface display that can be surfaced for user 116, showing the recommendations. For instance, the recommendations may list certain items that search system 158 has found, based on the matching data store records. It is thus likely that those items are to be included in the document that is being created within system 110. Those items are thus surfaced for user 116 so that user 116 can approve of those items for inclusion in the document. For instance, the user 116 may select a subset of those items, all of the items, or none of the items, as being items that are to be included in the document. This information is transmitted back to document processing computing system 110 using communication system 124.

Document generation/population system 160 then creates the document and populates it with the items that were approved for inclusion in the document by user 116. It then uses extension interaction logic 107 or communication system 162 to send the pre-populated document back to e-mail computing system 102. Document presentation/interaction logic 144 generates a representation of the pre-populated document and uses user interface generation logic 142 to generate a representation of a user interface that can be surfaced for user 116, showing the pre-populated document, or an overview or other representation of the pre-populated document, etc. The user interface display showing the pre-populated document will also illustratively include a user actuatable element that can be actuated by user 116 to send that pre-populated document, by e-mail, to a desired recipient. For instance, if the e-mail being processed was sent by user 120 to user 116, requesting a quote for certain items, then user 116 may actuate the user actuatable element to e-mail the pre-populated document (the prepopulated quote) to user 120. In that case, document presentation/interaction logic 144 detects user interaction with the user actuatable element and uses mailbox logic 128 to send the e-mail, including the pre-populated document, to user 120. It also communicates an indication of this back to document processing computing system 110 so that the various different portions of document processing functionality 166 can generate a record indicating that the document has been e-mailed to user 120, along with any contextual information, such as the sender of the e-mail, the date it was sent, etc.

Figure 2A:
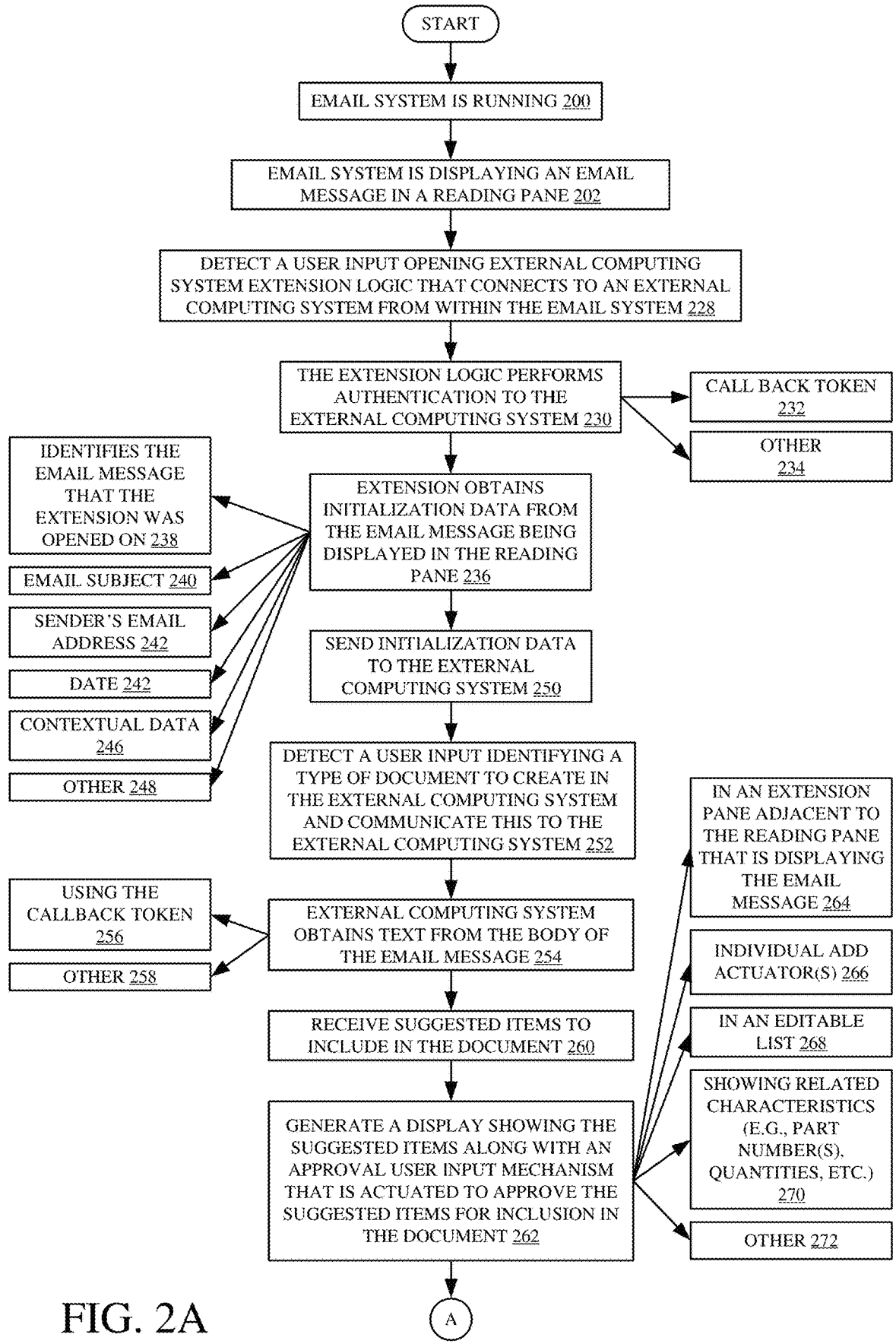
FIGS. 2A-2C (collectively referred to herein as FIG. 2) illustrate a flow diagram showing one example of the operation of an extension in the e-mail system shown in FIG. 1.
Figure 2B:
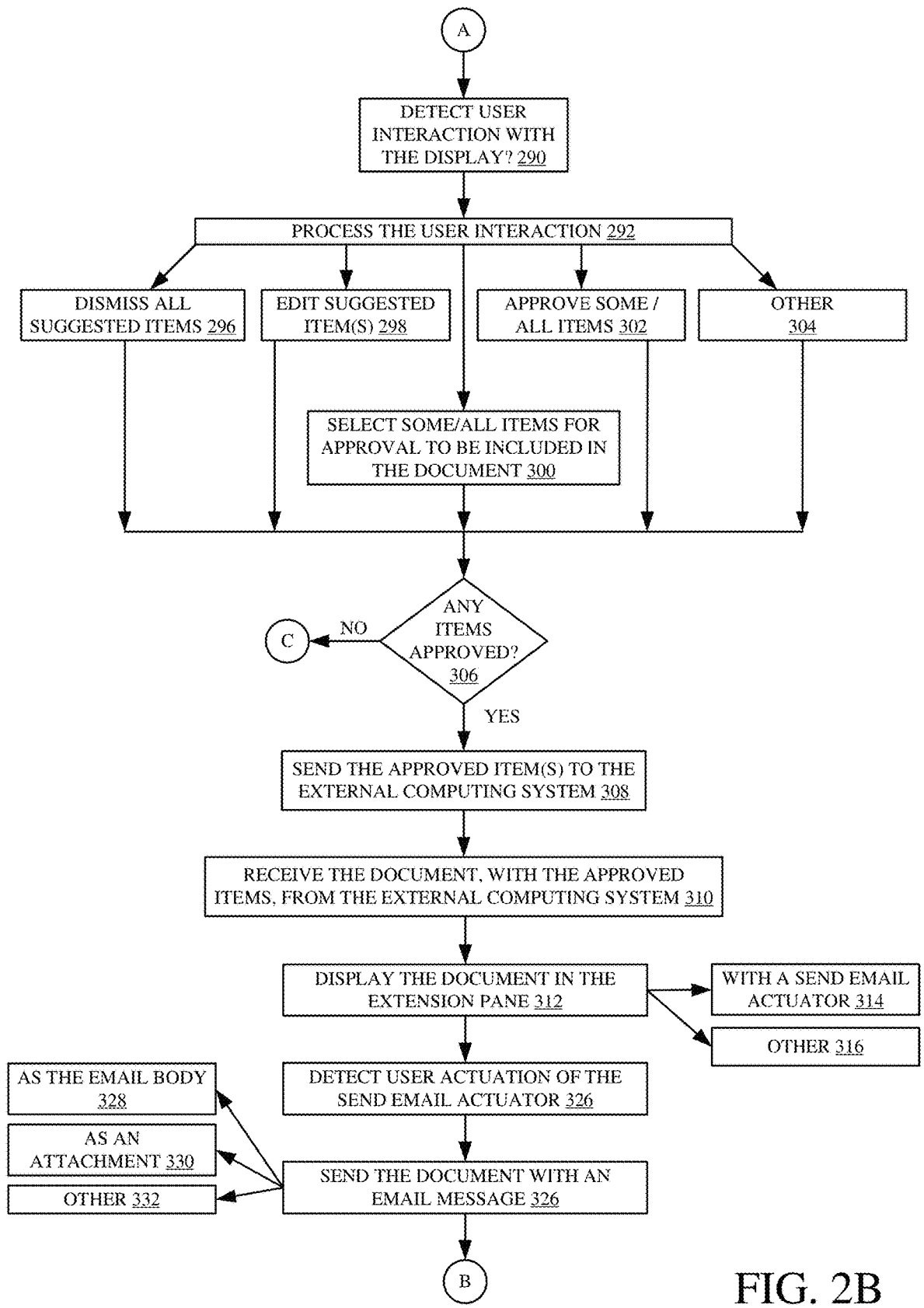
Figure 2C:
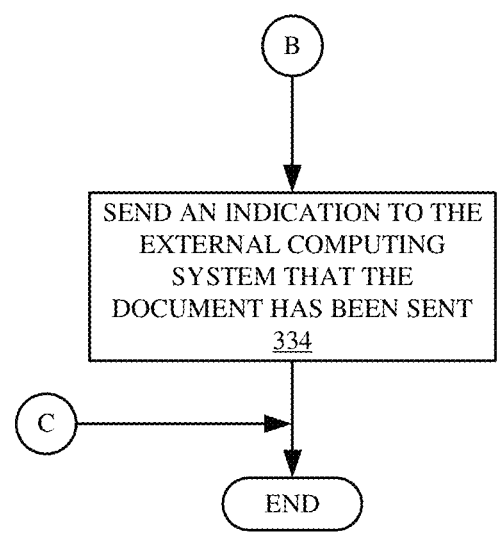

FIGS. 2A-2C (collectively referred to herein as FIG. 2) show a flow diagram illustrating one example of the operation of extension logic 126 (and e-mail computing system 102) in interacting with document processing computing system 110 to have a document automatically created and pre-populated so that it can be e-mailed. By automatically it is meant that the step or function is performed without any further user involvement, except, perhaps to initiate or approve of it. The description will proceed with respect to user 120 being the sender of the original e-mail message, and user 116 being the user that interacts with extension logic 126 to have the document automatically created within document processing computing system 110 and pre-populated, and subsequently e-mailed to user 120.

Figure 3A:
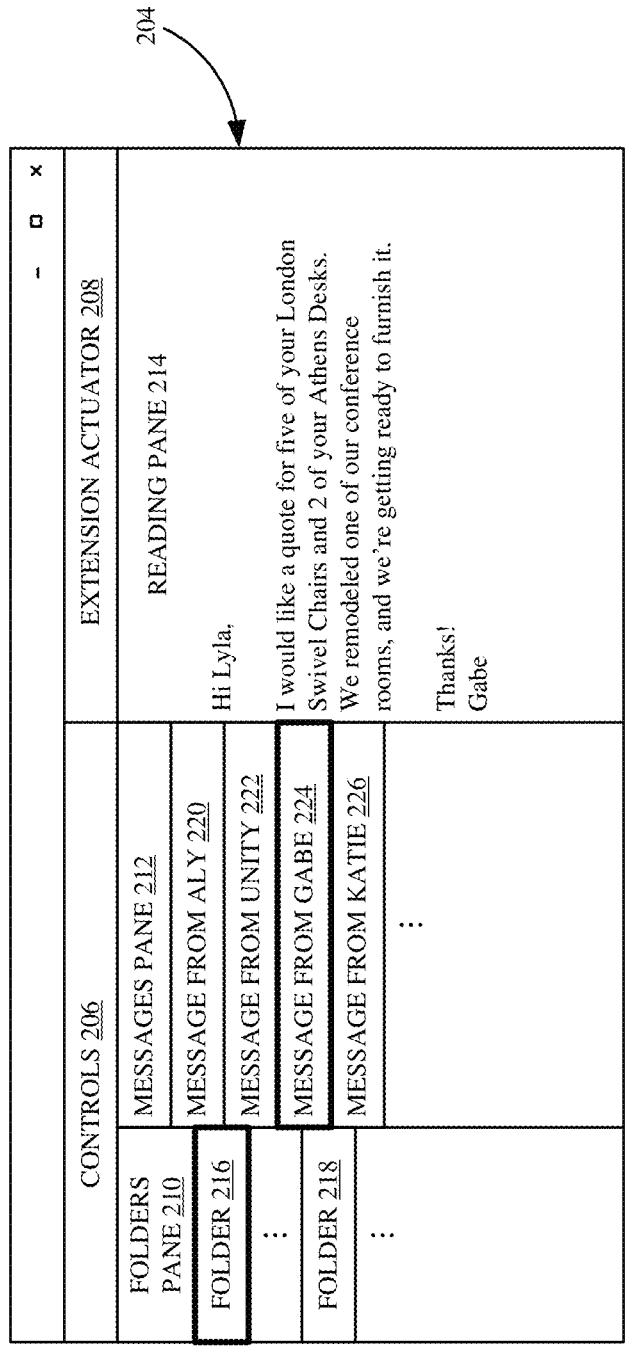
FIGS. 3A-3C show examples of user interface displays that can be generated from the extension within the e-mail system shown in FIG. 1.

It is first assumed that e-mail system 102 is running. This is indicated by block 200. It is also assumed that e-mail computing system 102 is using mailbox logic 128 and user interface logic 130 to display an e-mail message in a reading pane generated by e-mail system 102. This is indicated by block 202. FIG. 3A shows one example of this.

FIG. 3A shows an example of a user interface display 204 that can be generated by e-mail computing system 102. In one example, user interface display 204 includes a controls portion 206 that includes a variety of different user actuatable control elements to control some functions of e-mail computing system 102. One of the control elements can include extension actuator 208 that can be actuated to launch extension logic 126. User interface display 204 also illustratively includes a folders pane 210, a messages pane 212, and a reading pane 214. It can be seen in FIG. 3A that the folders pane 210 includes a plurality of different folder elements 216-218 each corresponding to a folder that is configured within the e-mail account of user 116. Messages pane 212 includes a set of user actuatable message elements 220, 222, 224, and 226. Display 204 also illustratively shows that reading pane 214 is displaying the body of an e-mail message. The user can actuate one of the user actuatable folder elements 216-218 to select a folder for which messages can be viewed. Once the folder is selected, then message pane 212 displays the user actuatable message elements 220-226 that correspond to the messages in the selected folder. When the user actuates one of elements 224-226, then the body of the corresponding e-mail message is displayed in reading pane 214. It can be seen in FIG. 3A that the user has selected the folder element 216 and the message element 224 to have the body of the e-mail message corresponding to element 224 displayed in reading pane 214.

User interface logic 130 then detects a user input opening an external computing system extension (e.g., launching extension logic 126) that connects to an external computing system (e.g., document processing computing system 110) from within e-mail system 102. This is indicated by block 228 in the flow diagram of FIG. 2. By way of example, and referring again to FIG. 3A, user 116 may actuate the extension actuator 208. This illustratively launches extension logic 126 so that the user can be connected to document processing computing system 110 from within e-mail system 102, and without navigating away from the displayed e-mail message.

In response, authentication logic 134 connects to authentication system 156 in document processing computing system 110 so that extension logic 126 can be authenticated by authentication system 156. This authentication can be performed in a wide variety of different ways. Performing the authentication is indicated by block 230 in the flow diagram of FIG. 2. In one example, authentication system 156 receives a callback token from authentication logic 134. This is indicated by block 232. The callback token can be used, as is described in greater detail below, to obtain the body of an e-mail message that is open on e-mail computing system 102 when extension logic 126 is launched. The authentication process can include other items 284 as well.

Initialization logic 136 in extension logic 126 then obtains initialization data corresponding to the e-mail message being displayed in the reading pane 214. This is indicated by block 236 in the flow diagram of FIG. 2. In one example, the initialization data can identify the particular e-mail message that is being displayed when the extension logic was opened (or launched). That is, it can identify the particular e-mail message that was displayed in reading pane 214 when user 116 actuated extension actuator 208. Identifying the e-mail message that the extension was opened on is indicated by block 238 in the flow diagram of FIG. 2. The initialization data can include the e-mail subject information (such as information from a "regarding" field, or a "subject" field on the e-mail message. This is indicated by block 240. The initialization data can include the sender's e-mail address as indicated by block 242, the date the e-mail message was sent, as indicated by block 244, any other contextual data as indicated by block 246, or a wide variety of other data, as indicated by block 248.

Initialization logic 136 then sends the initialization data to initialization data processing logic 109 in document processing computing system 110. This is indicated by block 250 in the flow diagram of FIG. 2.

At some point, user interface generator logic 142 in extension logic 126 generates a representation of a user actuatable element that can be surfaced for user 116. The user actuatable element can be actuated to identify a particular type of document that user 116 wishes to be created within document processing computing system 110, based upon the e-mail message that user 116 is viewing. By way of example, and assuming that document processing computing system 110 creates and maintains documents such as quotes, offers, sales invoices, and other such documents, it may be that the user actuates a user actuatable element corresponding to a "Quote" document that the user wishes to have created.

In the example shown in FIG. 3A, it can be seen that the body of the e-mail message displayed in reading pane 214 includes textual elements which state: "I would like a quote for five of your London swivel chairs and 2 of your Athens desks." Thus, user 116 illustratively actuates a user actuatable element indicating that the user wishes to have a "Quote" document created within document processing computing system 110. Document selection logic 140 detects the user selection of a type of document to be created, and communicates this to document processing computing system 110. Detecting user selection of the type of document that is to be created, and communicating this to computing system 110 is indicated by block 252 in the flow diagram of FIG. 2.

In response, e-mail body retrieval logic 111 in extension interaction logic 107 interacts with e-mail body handling logic 138 to obtain the text from the body of the e-mail message being displayed. This is indicated by block 254. In one example, e-mail body retrieval logic 111 can use the callback token and the e-mail message identifier that identifies the e-mail message that the extension logic 126 was opened on, to retrieve the body of that e-mail message through a separate interface. This is indicated by block 256. The body of the e-mail message can be obtained by e-mail body retrieval logic 111 in a wide variety of other ways as well, and this is indicated by block 258.

Document processing computing system 110 then processes the body of the e-mail message to identify items in the body of the e-mail message that will be recommended for inclusion in the Quote document that is to be created. Extension interaction logic 107 then sends an indication of those recommended items back to extension logic 126 where they can be surfaced by user interface generation logic 142 for selection or approval by user 116. The process by which the suggested items are identified in the body of the e-mail message is described in greater detail below with respect to FIGS. 4-11. Receiving the suggested items, that are suggested for inclusion in the document, at extension logic 126 (and specifically at user interface generation logic 142) is indicated by block 260 in the flow diagram of FIG. 2.

User interface generation logic 142 then generates a display showing the suggested items, along with an approval user input mechanism that is actuated to approve the suggested items for inclusion in the Quote document that is to be created within document processing computing system 110. This is indicated by block 262. In one example, the suggested items can be displayed in an extension pane that is displayed adjacent to the reading pane 214 (shown in FIG. 3A) that is displaying the e-mail message. Displaying the suggestions in the extension pane is indicated by block 264.

Each of the suggested items may have an individual "add" actuator so that the items can be approved or rejected individually. This is indicated by block 266. The items can be displayed in an editable list so that item descriptions, or other information can be edited by user 116 before they are included in the document. This is indicated by block 268. The items can be displayed showing related characteristics, such as part numbers, quantities, etc. This is indicated by block 270. The suggested items can be displayed in a wide variety of other ways, and this is indicated by block 272.

Figure 3B:
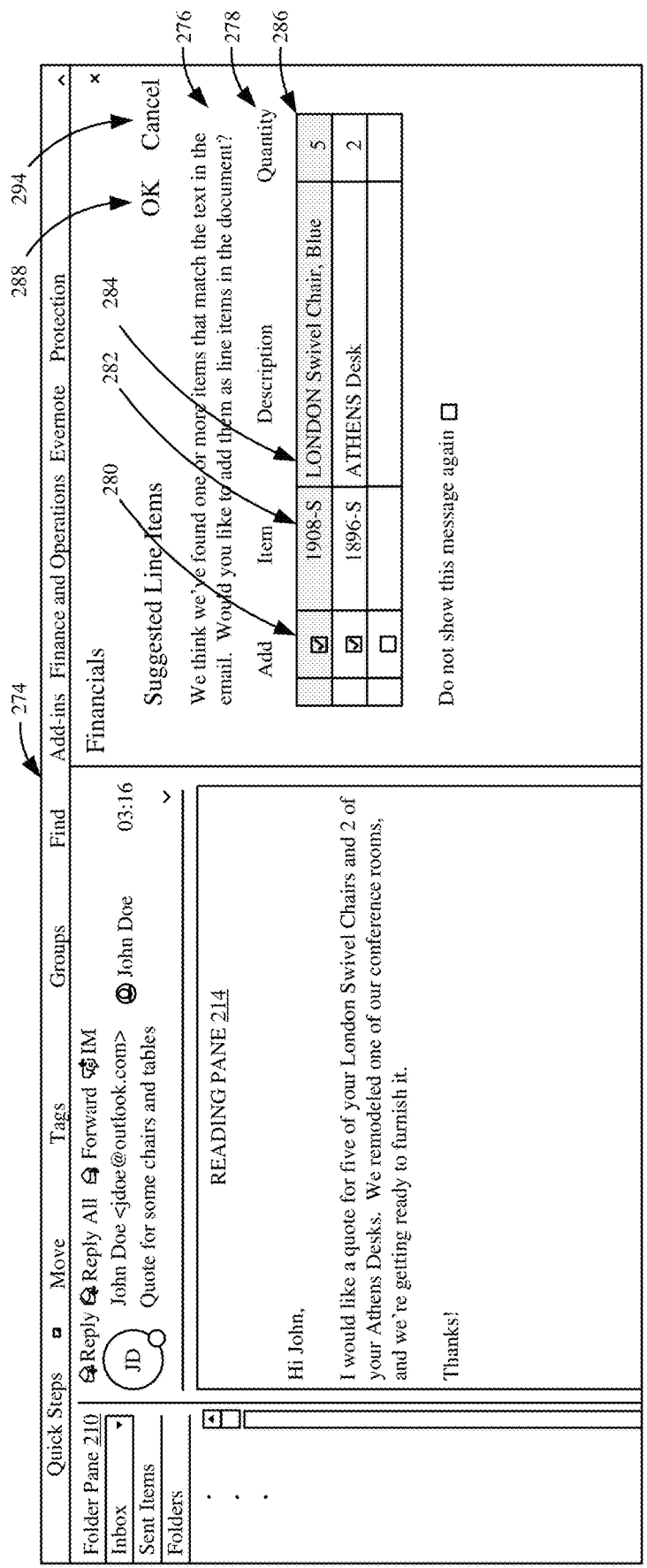

FIG. 3B shows one example of a user interface display 274 that can be generated to show the suggested items. Some of the things on user interface display 274 are similar to those shown on user interface display 204, in FIG. 3A, and they are similarly numbered. It can be seen in FIG. 3B, however, that the reading pane 214 is now shifted to the left on user interface display 274, from where it was shown on user interface display 204. An additional pane 276 has now been opened to show the suggested items that are suggested for inclusion in the "Quote" to be generated in document processing computing system 110. It can be seen that the items are listed at a suggested item display portion 278 where each item has a corresponding add actuator 280, an item number 282, an item description 284, and a suggested quantity shown generally at 286. In one example, the add actuators 280 can be individually actuated by user 116 in order to indicate that the corresponding suggested items should be included in the "Quote" document. It can be seen in the example shown in FIG. 3B that two suggested items have been identified. The first is described as "London Swivel Chair, blue", and the second is described as "Athens Desk". Both of those items have been "added" by user 116 actuating the corresponding add actuator 280. The user 116 then illustratively actuates the OK actuator 288 to indicate that the suggested items that have been displayed to the user, and that the user has approved for inclusion in the "Quote" document, have now been selected.

In one example, user interface generation logic 142 uses user interface logic 130 to detect user interaction with the suggested item in pane 276. Detecting user interaction with the display is indicated by block 290 in the flow diagram of FIG. 2. Extension logic 126 will then process the information captured on the display pane 176 based upon the detected user interaction. This is indicated by block 292.

By way of example, user 116 can dismiss all of the suggested items, so that none of them are included in the "Quote" document. This can be done, for instance, by actuating the "cancel" actuator 294. Dismissing all of the suggested items is indicated by block 296 in the flow diagram of FIG. 2.

In another example, user 116 can edit the suggested items, by changing the quantity 286, the description 284, the item number 282, or otherwise. Editing the suggested items is indicated by block 298.

The user can select some or all of the items for approval, so that they are included in the "Quote" document. This can be done by, for instance, actuating the add actuators 280. This is indicated by block 300 in the flow diagram of FIG. 2.

User 116 can then approve the selected items by actuating the "OK" actuator 288. This is indicated by block 302. It will be noted that user 116 may be able to interact with the display in other ways as well. This is indicated by block 304.

User interface generation logic 142 then determines whether any of the suggested items were approved. This is indicated by block 306. If not, then processing with respect to this particular set of selected items is complete. However, if, at block 306, some of the items were approved, then user interface generation logic 142 uses communication system 124 to send the approved items to the extension interaction logic 107 in document processing computing system 110. This is indicated by block 308. Document processing computing system 110 then creates the identified document (e.g., the "Quote" document) and pre-populates it with the items that were approved by user 116. It then sends the pre-populated document (or an overview or other representation of it) back to e-mail system 102 where it can be surfaced and viewed by user 116. The particular way in which document generation/population system 160 generates and populates the document with the approved items will vary based upon the particular type of document processing computing system 110 that is creating and populating the document, based upon the document itself, etc. Suffice it to say, for now, that the document is created in system 110, it is pre-populated with the items that were approved by user 116, and the pre-populated document is sent back to extension logic 126 in e-mail computing system 102. Receiving the document with the approved items, from document processing computing system 110 is indicated by block 310 in the flow diagram of FIG. 2.

Document presentation/interaction logic 144 then generates a representation of a user interface display showing the pre-populated document (or an overview or other representation of it) and uses user interface logic 130 to surface that representation for user 116. In one example, the document is displayed in the extension pane 276. This is indicated by block 312. It can also be displayed with a "send e-mail" actuator that can be actuated by user 116 to send the document to user 120. This is indicated by block 314. The document can be displayed for user 116 in other ways as well, and this is indicated by block 316.

Figure 3C:
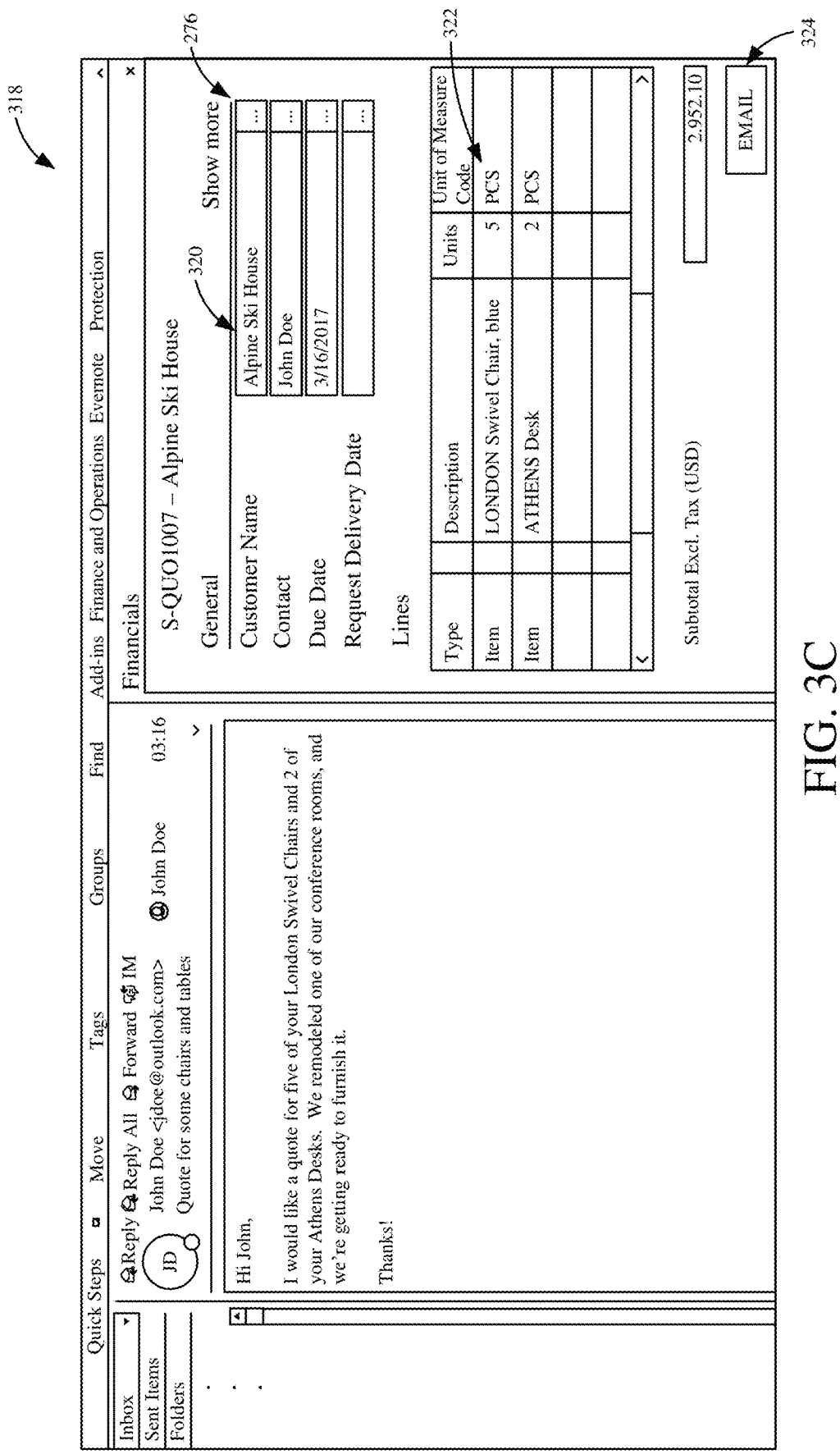

FIG. 3C shows one example of a user interface display 318, that indicates this. User interface display 318 has some things that are similar to user interface display 274 (shown in FIG. 3B) and they are similarly numbered. However, it can now be seen that, in FIG. 3C, the user interface display generated by user interface generation logic 142 is a representation of the "Quote" document and is displayed in the extension pane 276. It can be seen the "Quote" document includes identifying or context information 320 that can be generated or obtained by initialization data processing logic 109 based upon the initialization data received from initialization logic 136 in extension logic 126. Thus, the identifying information can include a customer name and contact information, both of which may be associated with the sender of the e-mail who was identified in the initialization data, within document processing computing system 110, or a wide variety of other information. Thus, this context information 320 can be pre-populated into the "Quote" document.

In addition, it can be seen that the approved items are included in the "Quote" document as generally indicated at 322. The two suggested items, which were approved by user 116, appear as line items in the "Quote" document.

FIG. 3C also shows that the representation of the "Quote" document includes an "e-mail" actuator 324 that can be actuated by user 116 to have the "Quote" document e-mailed to user 120.

Once the representation of the pre-populated "Quote" document is displayed in the extension pane 276, then user 116 can interact with it in a wide variety of different ways. For instance, the user can edit it, discard it, or otherwise modify it. It is assumed that, at some point, the user actuates the e-mail actuator 324. Detecting user actuation of the e-mail actuator is indicated by block 326 in the flow diagram of FIG. 2. This is detected by document presentation/interaction logic 144. Logic 144 then uses communication system 124 to send the document with an e-mail message to user 120. This is indicated by block 326. In one example, the "Quote" document can be sent as the body of an e-mail message. This is indicated by block 328. It can be sent as an attachment, as indicated by block 330, or it can be sent in other ways, as indicated by block 332.

Document presentation/interaction logic 144 then also sends an indication that the document was e-mailed to user 120, back to document processing computing system 110, so that a record of that e-mail can be maintained in system 110. This is indicated by block 334 in the flow diagram of FIG. 2.

Figure 4A:
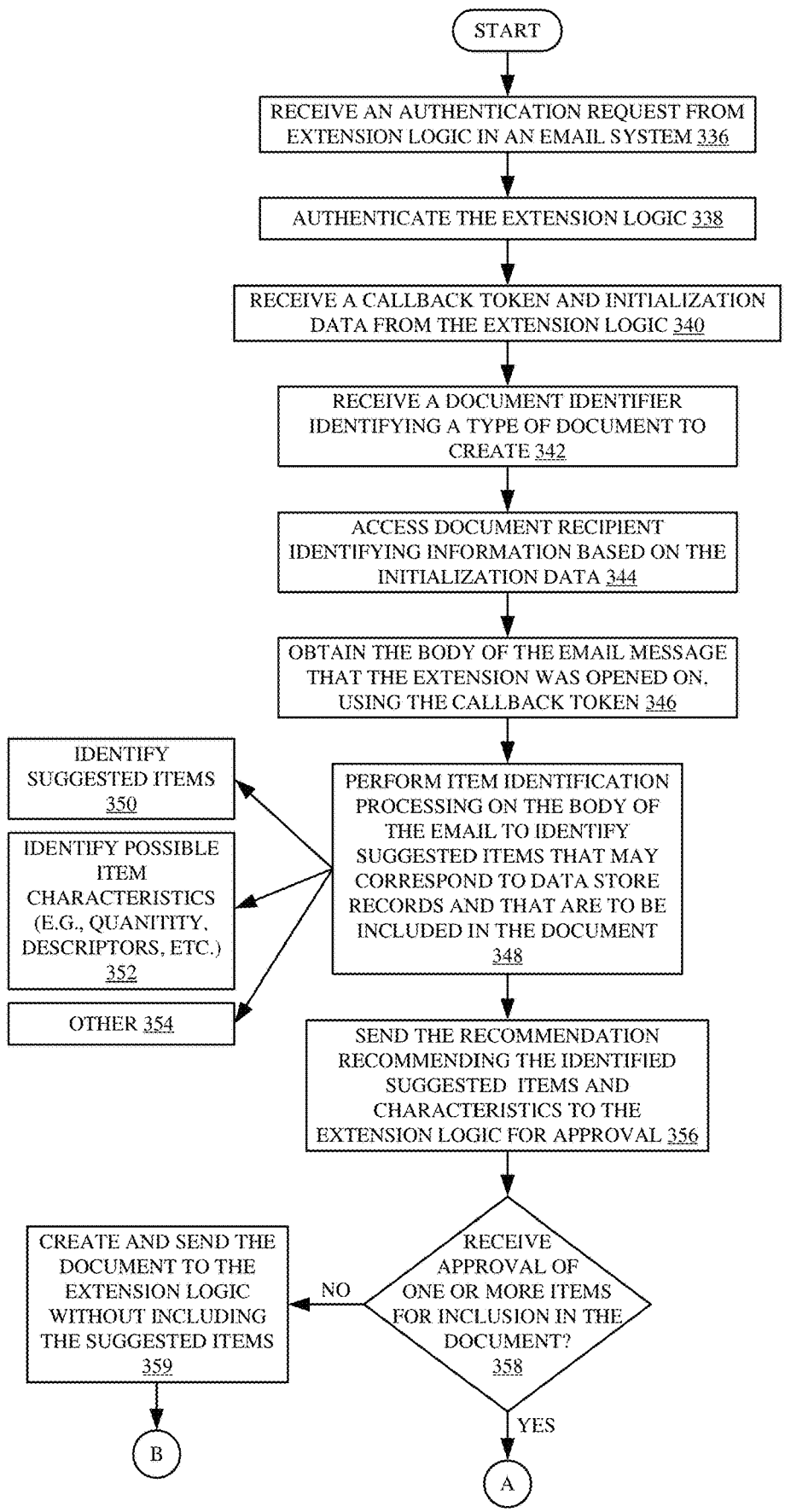
FIGS. 4A and 4B (collectively referred to herein as FIG. 4) illustrate a flow diagram showing one example of the operation of the document processing computing system in receiving a body of an e-mail message and identifying items to be included in a document.
Figure 4B:
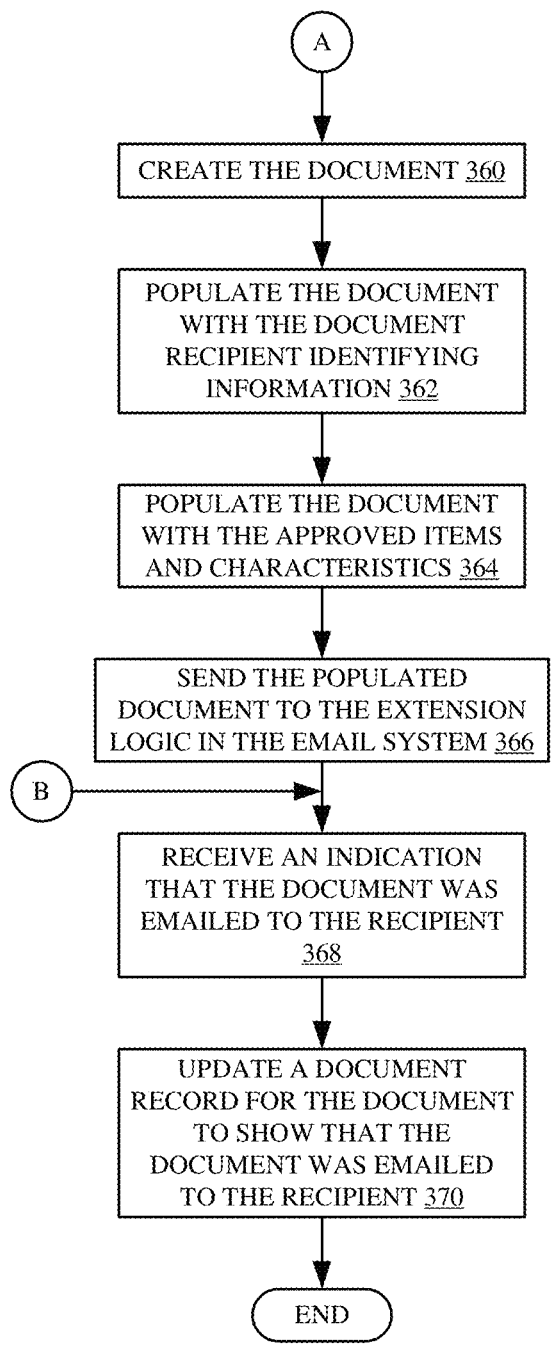
Figure 5A:
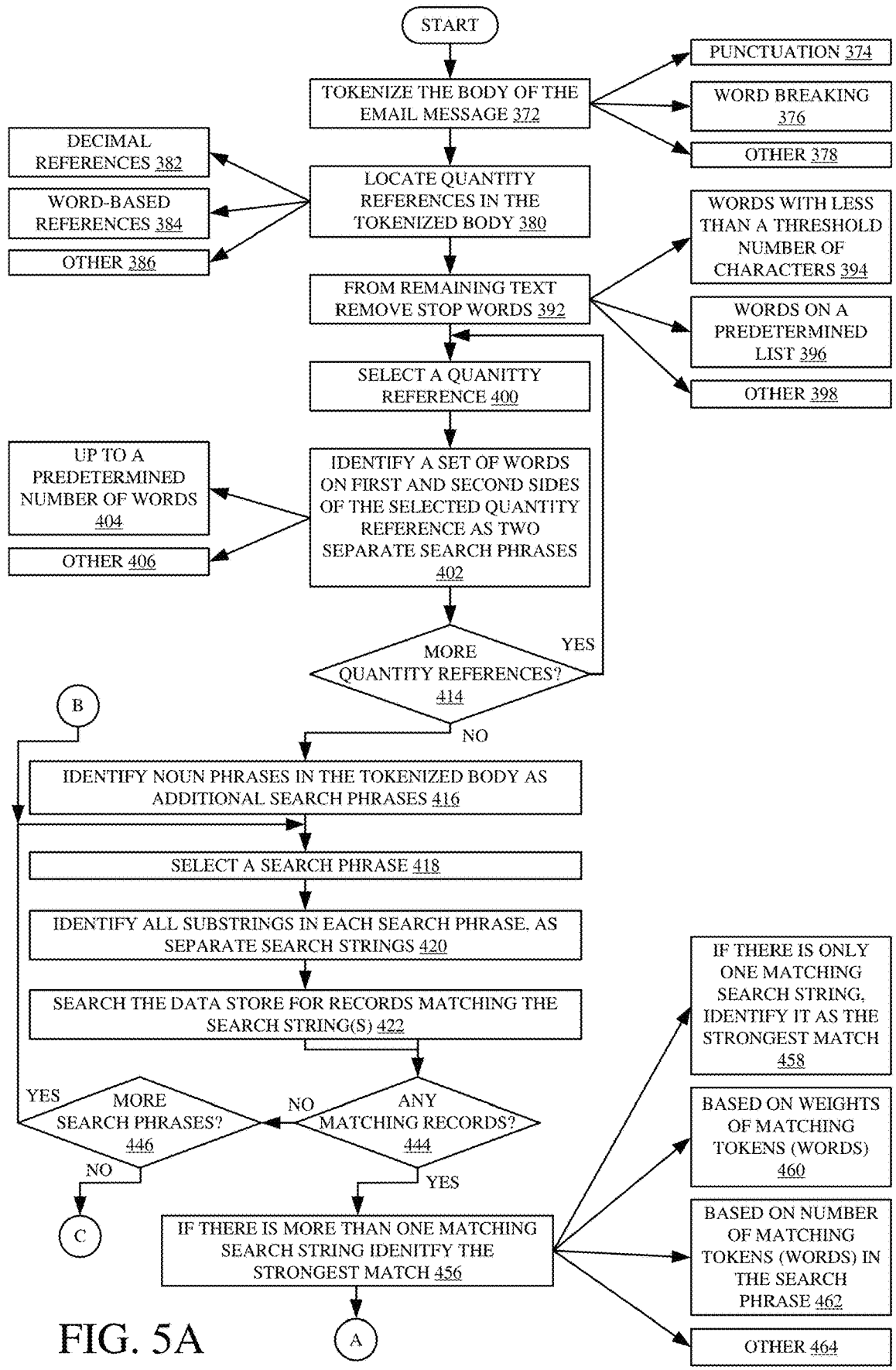
FIGS. 5A and 5B (collectively referred to herein as FIG. 5) show a flow diagram illustrating one example of the operation of the document processing computing system in identifying the items to be included in the document, in more detail.
Figure 5B:
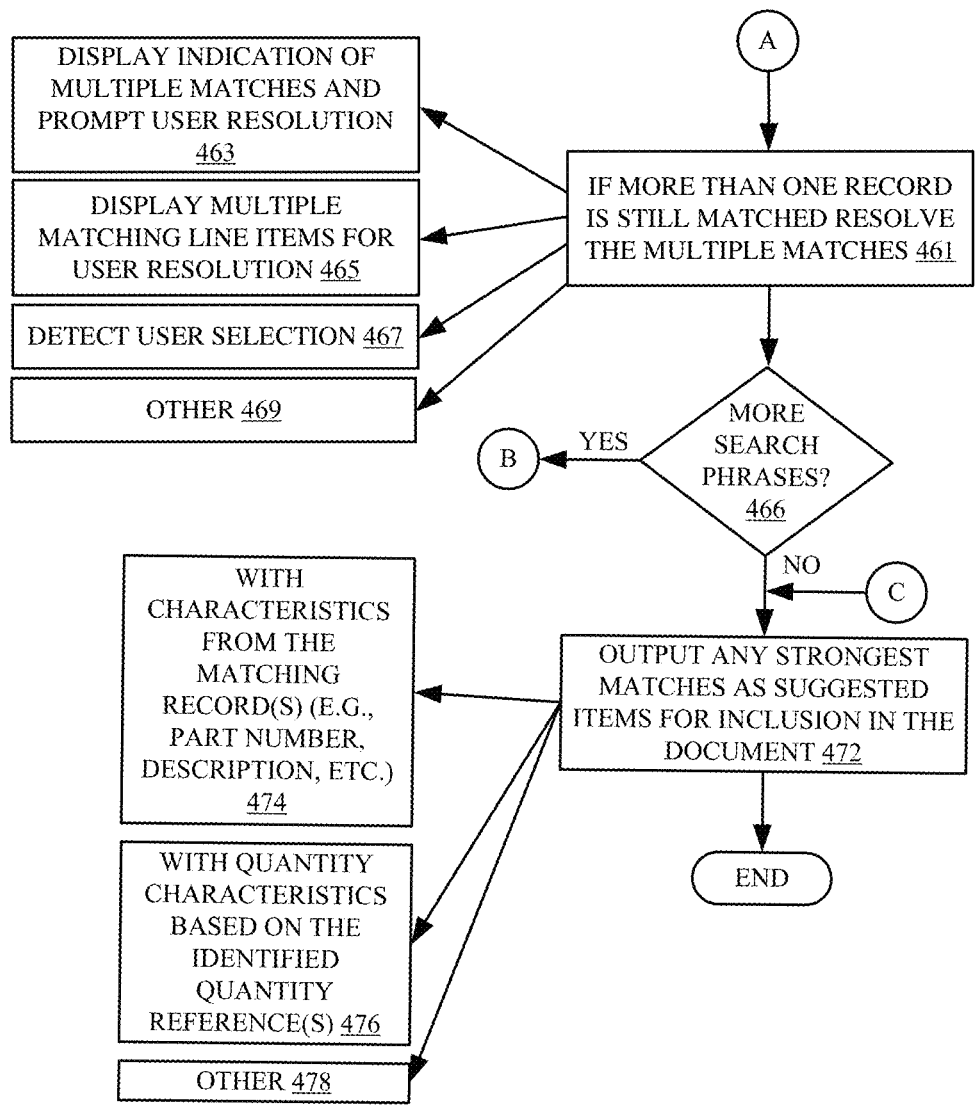

FIGS. 4A and 4B (collectively referred to herein as FIG. 4) illustrate a flow diagram showing one example of the operation of document processing computing system 110 in interacting with extension logic 126 to generate the recommended items and to create an pre-populate the document based on those interactions. Thus, it is basically describing the same process discussed above with respect to FIG. 2, but from the viewpoint of document processing computing system 110.

It is therefore first assumed that authentication system 156 receives an authentication request from extension logic 126 in e-mail computing system 102. This is indicated by block 336 in the flow diagram of FIG. 4.

Authentication system 156 then authenticates the extension logic 126 from which the authentication request was received. This is indicated by block 338 and it can be done in a wide variety of different ways, based upon the particular authentication mechanisms that are used.

Initialization data processing logic 109 then receives the initialization data, which can include a callback token, from initialization logic 136 in extension logic 126. Receiving the callback token and initialization data from the extension logic is indicated by block 340 in the flow diagram of FIG. 4.

Document generation/population system 184 eventually receives a document identifier from extension logic 126, identifying the type of document that user 116 wishes to create within document processing computing system 110. Again, assume for the sake of example that the type of document is a "Quote" document. Receiving the document identifier identifying the type of document to create is indicated by block 342 in the flow diagram of FIG. 4.

Recall that the initialization data will illustratively include the identity of the sender of the e-mail. Based upon that information, document generation/population system 160 illustratively accesses document recipient identifying information to identify various context data corresponding to that sender. For instance, it can identify the company the sender is associated with, and various other information associated with that sender. Accessing the recipient identifying information is indicated by block 344 in the flow diagram of FIG. 4.

E-mail body retrieval logic 111 then obtains the body of the e-mail message that the extension logic 126 was opened or launched on, using the callback token. This is indicated by block 346. In one example, it can call a separate interface, using the callback token and the e-mail identifier that identifies the particular e-mail message, to obtain the body of the e-mail message. It can obtain the body in other ways as well.

Natural language processing system 112, search system 158 and recommendation generator logic 159 all work to identify items in the body of the e-mail message that recommendation generator logic 159 will use to generate recommendations. The recommendations will identify those items as being recommended for inclusion in the "Quote" document. This is indicated by block 348 in the flow diagram of FIG. 4. As discussed above, the suggestion or recommendation can identify the suggested items as indicated by block 350. It can also identify item characteristics of the suggested items, such as quantities, part numbers, descriptors, etc. This is indicated by block 352. The recommendation can include a wide variety of other items 354 as well.

The recommendation, recommending the suggested items and characteristics is then sent to extension logic 126, so that it can be surfaced for approval by user 116. This is indicated by block 356 in the flow diagram of FIG. 4. The user then interacts with the recommendation and can approve some or all of the items, or discard the recommendation. If none of the suggested items were approved, as determined at block 358, then document generation/population system 160 simply creates the document, without pre-populating it with the suggested items, and sends it back to the extension logic 126 in e-mail system 122. This is indicated by block 359. However, if, at block 358, it is determined that some of the items have been approved for inclusion in the document, then document generation/population system 184 creates the "Quote" document within document processing computing system 110. This is indicated by block 360. It populates the document with the document recipient identifying information. This is indicated by block 362. It also populates the document with the approved items and characteristics, as indicated by block 364.

Document generation/population system 160 then sends the populated document (or an overview or other representation of it) back to document presentation/interaction logic 144 in the extension logic 126 of e-mail system 102. This is indicated by block 366 in the flow diagram of FIG. 4. It can be done using extension interaction logic 107 or otherwise. Other document processing functionality 166 then receives an indication from extension logic 126 indicating that the document was e-mailed to the recipient. This is indicated by block 368. That functionality then updates a document record for the document, to show that the document was e-mailed to the recipient. This is indicated by block 370. The record can include contextual information, such as the customer, the date that the e-mail was sent, among a wide variety of other information.

FIGS. 5-11 illustrate one example, in more detail, of how the body of the e-mail message is processed to identify suggested items that are recommended to user 116 for inclusion in the document. Again, it is assumed for the sake of the present example, that the body of the e-mail message is the same as discussed above with respect to FIG. 3A. It is also assumed that user 116 has identified that he or she wishes to create a "Quote" document within document processing computing system 110. It is further assumed that e-mail body retrieval logic 112 has retrieved the body of the e-mail message for processing.

Token generator logic 168 then tokenizes the body of the e-mail message. This is indicated by block 372 in the flow diagram of FIG. 5. It can do this in any of a wide variety of different ways. For instance, it can divide the e-mail body into tokens (or textual elements) based on punctuation 374, by using word breaking 376, or in other ways 378. For purposes of the present description, while the tokens (or textual elements) could be noun phrases, n-grams, or other tokens, they will be described as being words, numbers, alphanumeric strings, letter strings and number strings separated by a white space, and punctuation, but this is for the sake of example only.

Quantity identifier logic 174 then identifies quantity references in the tokenized e-mail body. This is indicated by block 380. In one example, the quantity references can be decimal references (such as numbers), as indicated by block 382. The quantity references can also include word-based references as indicated by block 384, or they can be other references as well, as indicated by block 386.

FIGS. 6A and 6B show one example of this. FIG. 6A shows that, where the e-mail message body is that shown above with respect to FIG. 3A, token generator logic 168 can generate word-based tokens for the e-mail body. FIG. 6A shows word tokens that are generated for the first sentence in the body of the e-mail message shown in FIG. 3A. Each word in FIG. 6A makes up a token, as does the number "2" and the period (or punctuation mark) at the end of the sentence.

FIG. 6B shows that quantity identifier logic 174 has identified two tokens 388 and 390 as being quantity references. Token 388 is the textual element "five" and token 390 in the textual element "2". Thus, tokens 388 and 390 are quantity references From the remaining textual elements (other than those identified as quantity references), stop word removal logic 178 removes stop words. This is indicated by block 392 in the flow diagram of FIG. 5. In one example, the stop words that are removed are those words with less than a threshold number of characters (such as less than four characters). This is indicated by block 394. They can be words on a predetermined list of stopwords, as indicated by block 396, or they can be identified as stop words in other ways as well, and this is indicated by block 398.

Once the stop words are removed, parsing logic 170 selects one of the quantity references and then identifies a set of textual elements (in this example, words) on either side of the selected quantity references. The sets of words on one side make up a first search phrase, and the sets of words on the other side make up a second search phrase. Selecting a quantity reference is indicated by block 400, and identifying a set of words on the first side and second side of the selected quantity reference as two separate search phrases is indicated by block 402. In one example, parsing logic 170 selects the set of words on either side of the selected quantity reference up to a predetermined number of words in the tokenized string. This is indicated by block 404. The set of words on either side can be identified in other ways as well, and this is indicated by block 406.

FIG. 6C shows one example of this. FIG. 6C now shows the tokenized string illustrated in FIG. 6B, with the stop words removed. In the example illustrated in FIG. 6C, the stop words are words, other than the quantity references, that have fewer than four letters. FIG. 6C also shows that parsing logic 170 has identified a first set of words 408 on a first side of the quantity reference 388, and second set of words 410, on the second side of quantity reference 388. Similarly, FIG. 6C shows that parsing logic 170 has identified a set of words 412 on the second side of quantity reference 390. Because the set of words 410 was already identified as a search phrase, that search phrase need not be duplicated.

Parsing logic 170 continues to select a quantity reference in the tokenized string and identify the search phrases on either set of the selected quantity reference until all quantity references have been selected and processed. This is indicated by block 414 in the flow diagram of FIG. 5.

Once all of the search phrases are identified, in this way, by parsing logic 170, then noun phrase identifier logic 176 identifies any noun phrases in the tokenized string, that are not part of a search phrase, and identifies those noun phrases as additional search phrases. This is indicated by block 416 in the flow diagram of FIG. 5. Search string generator logic 178 then selects one of the search phrases and breaks it down into all possible substrings of tokens. It identifies each of the search phrases and all substrings in each of the search phrases, as separate search strings. Selecting a search phrase is indicated by block 418 in FIG. 5 and identifying the search phrase, and all substrings in that search phrase, as separate search strings is indicated by block 420.

These search strings are then provided from search string generator logic 178 to search system 158 which uses data store accessing logic 182 to search searchable data 188 for any matching records, that match any of the search strings that were provided to it. This is indicated by block 422 in the flow diagram of FIG. 5. An example may be helpful.

FIG. 7 shows that search phrase 408 (shown in FIG. 6C) includes the words "would like quote". The substrings that can be formed from search phrase 408 include "like quote" 424, "would like" 426, "would" 428, "like" 430, and "quote" 432. Each of these token strings 408 and 424-432 are identified by search string generator logic 178 as a separate search string which can be used by search system 158 to search the searchable data records 188 in data store 164.

FIG. 7 also shows an example of a portion of an item catalog which may form part of the searchable data 188 in data store 184. The item catalog has a first entry or record 434 corresponding to an "Antwerp Table". It has a second record 436 corresponding to "Athens Desk", another record 438 for "Rome Guest Chair", another record 440 for "London Swivel Chair", and another record 442 "Istanbul Coffee Table". Thus, each record represents an underlying item. Data store accessing logic 188 searches these records 434-442 for any that match any of the search strings 408 and 424-432. It can be seen that none of the search strings match any of the searchable data records 434-442. Thus, at block 444, search system 158 will determine that there are no matching records for any of the search strings generated for search phrase 408.

Processing thus continues at block 446 where search system 158 determines whether there are any more search phrases that have been identified and not yet processed. If so, search string generator logic 178 then selects a next search phrase at 418 and generates all of the search strings from that search phrase. It thus selects search phrase 410, itself, and generates all of the possible search strings for that search phrase. FIG. 8 shows an example of this.

Figure 9:
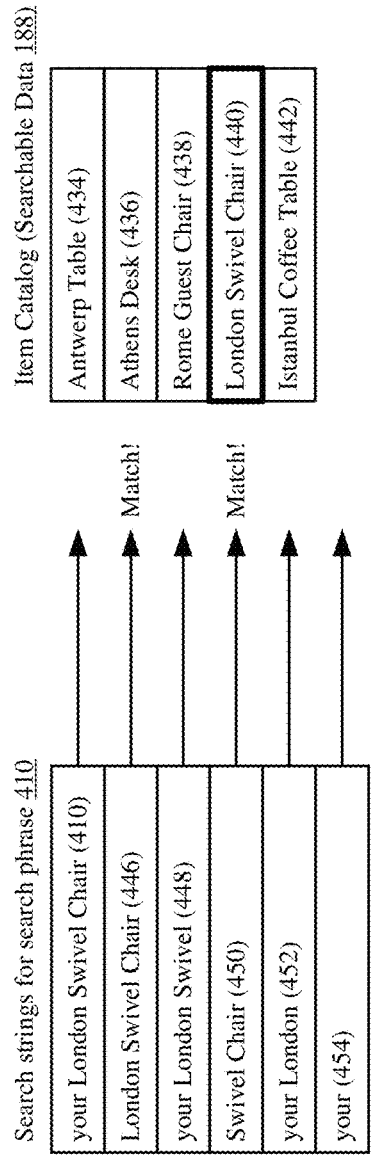

The search strings are identified by numerals 410 and 446-454. Data store accessing logic 182 then searches the searchable data 188 in data store 164 for records matching any of those search strings. FIG. 9 shows that both of the search strings 446 and 450 match data records 440 in the item catalog (searchable data 188). Thus, referring to block 444 in FIG. 5, search system 158 determines that there are matching records for some of the search strings generated based on search phrase 410. In fact, there are multiple matching search strings, but they all match only one data store record—the record for "London Swivel Chair". However, it may be that the search strings match more than one data store record. In that case, in one example, weighting logic 184 weights each of the matches (e.g., each instance in which a search string matches a data store record) to identify a strongest match. This is indicated by block 456 in the flow diagram of FIG. 5. If there is only one matching record, then that single matching record is identified as the strongest match. This is indicated by block 458. However, if there is more than one matched data store record, then weighting is used. The weighting can be based on the particular tokens that are matched. For instance, it may be that some words have a higher matching value than others. If the words are nouns, they may have a first weight indicating how strong the match is, while if they are adjectives, they may have a second weight. Of course, this is only one example of how the weightings may vary based upon the particular tokens that match. Other weighting mechanisms can be used as well. Weighting based upon the particular tokens that match is indicated by block 460 in the flow diagram of FIG. 5.

The weighting can be generated based upon the number of matching tokens (e.g., words) as well. For instance, search string 446 matches three words with record 440, while search string 450 only matches two words. Therefore, if the weighting is based on the number of matching tokens, then search string 446 is the strongest match to record 440. Matching based on the number of matching tokens is indicated by block 462.

The strongest match can be identified in other ways as well. This is indicated by block 464.

It may be that, even if a strongest match is identified, it matches more than one record in searchable data 188. If that is the case, then the multiple matches are resolved. This is indicated by block 461 in the flow diagram of FIG. 5. This can be done in a variety of different ways. For instance, an indication of the multiple matches can be surfaced for the user, and the user can be prompted to provide an input indicating that the user wishes to manually resolve the matches. This is indicated by block 463. When this user input is detected, the multiple matching line items can be displayed for user resolution. For instance, assume that two data records are matched. Then the line items for both of those data records can be displayed so that the user can select the proper one. The user selection of one of the line items is detected, and the corresponding data record is used as the matching record. This is indicated by block 467. The resolution can be performed in other ways as well, and this is indicated by block 469. An additional example of how multiple matching records can be resolved is described in more detail below with respect to FIGS. 12-16.

Search system 158 then again determines whether there are more search phrases to process. This is indicated by block 466 in the flow diagram of FIG. 5.

Figure 10:
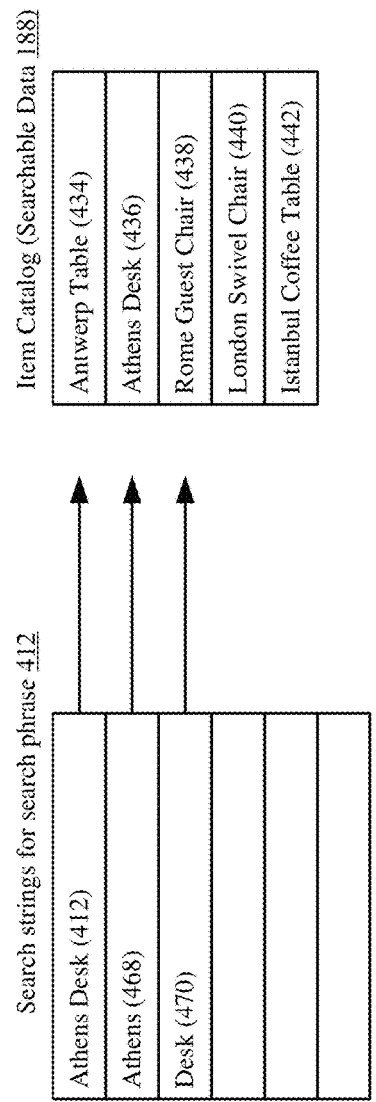
Figure 11:
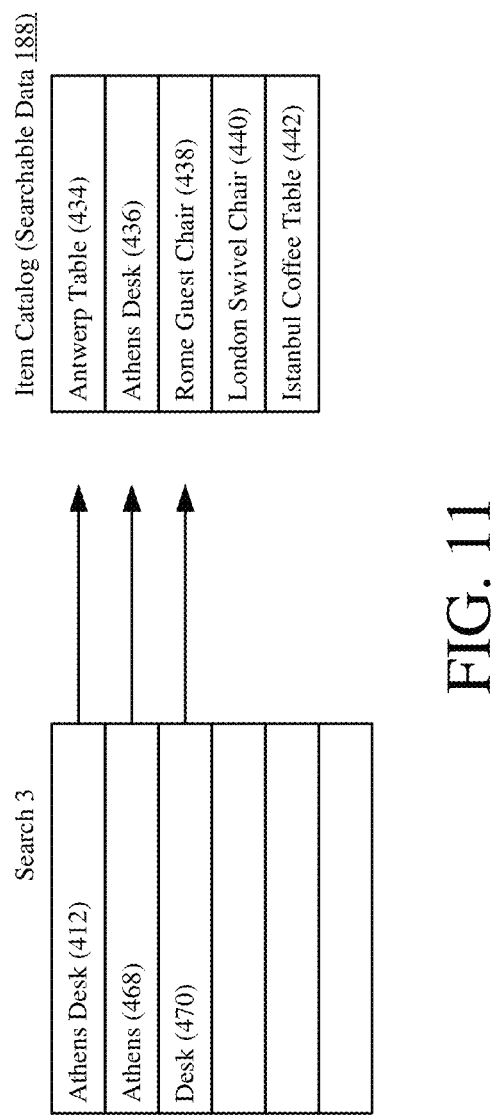

Thus, continuing with the present example, search phrase 412 has yet to be processed, so processing reverts to block 418 where search string generator logic 178 identifies search phrase 412 and generates substrings from that search phrase, to generate all of the various search strings that can be used based upon search phrase 412. FIG. 10 shows one example of this. FIG. 10 shows that the search strings that can be generated for search phrase 412 are search strings 412, 468, and 470. Data store accessing logic 182 in search system 158 then identifies whether any of those search strings match the data records in searchable data 188. It can be seen in FIG. 11 that all three search strings 412, 468 and 470 match one record 436. Thus, record 436 will be chosen as the strongest match and suggested items surfaced for approval to be in the Quote will include the item corresponding to record 436. However, if the search string matched more than one record, then, weighting logic 184 determines the strongest of those matches. Again, taking the example where the weighting is based upon the number of tokens that match, then that means that search 412 is the strongest match to record 436.

It should also be noted that, in order to identify a "matching" record, a number of techniques can be used. In one technique, if any word in a search string matches any word in the data record, this can be identified as a match. This increases the recall of the search system, while sacrificing precision. In another example, all of the tokens in the search string must be found in the data record in order for the two to be considered "matching". This reduces recall, but increases precision. In yet another technique, the tokens in the search string must be found in the data record, in the same order that they appear in the search string. This decreases recall further, but increases precision further as well. These are just examples, and a wide variety of other matching techniques can be used.

Once the strongest matches are identified, recommendation generator logic 159 then receives the search results output by search system 158. In one example, the search results identify the strongest matching records, and in another example, the search results include those records, themselves. Recommendation generator logic 159 then generates the recommendation, including, as the suggested items, the items identified in the strongest matching records. Outputting any strongest matching records as suggested items for inclusion in the document is indicated by block 472 in the flow diagram of FIG. 5. It should be noted, as discussed above, the suggested items can include the items identified by the records, along with characteristics from the matching records (such as part numbers, descriptions, etc.). This is indicated by block 474. The suggested items can include quantity characteristics based upon the quantity references. This is indicated by block 476. Outputting the strongest matches as suggested items can include a wide variety of other information 478 as well.

Figures 12, 13:
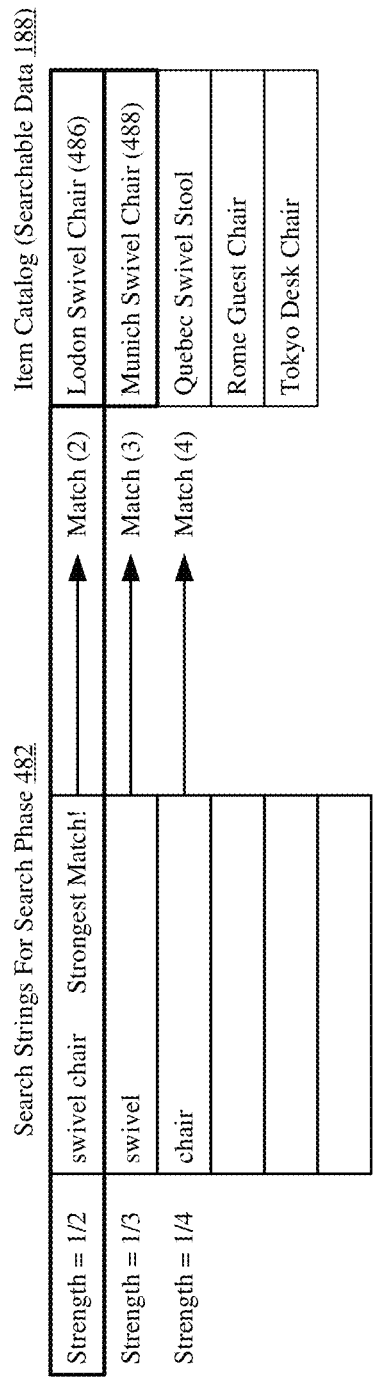
FIG. 12 shows another example of how items are identified in a text string.
FIG. 13 shows another example of identifying matched items from records in a data store.

FIGS. 12-16 illustrate an example (discussed above with respect to block 461 in the flow diagram of FIG. 3) where more than one matching data store record is identified, as matching a strongest search string. In FIG. 12, it is assumed that the e-mail message that is being viewed includes the sentence "Could you send me an additional quote for 10 swivel chairs?". It can be seen that quantity reference 480 (the numeral 10) is identified and search phrase "swivel chairs" 482 is also identified.

FIG. 13 shows the search strings that are generated for search phrase 482. FIG. 13 also shows that the first search string 484 ("swivel chair") is the strongest match, but it matches two data records in searchable data 188, those being "London swivel chair" 486, and Munich swivel chair" 488. In that case, recommendation generator logic 159 generates an indication showing that data records 486 and 488 both match the highest weighted search string and provides an indication of those matched data records, along with an indication that they both match the search string (so a conflict exists), to extension logic 126. User interface generation logic 142 then generates a representation of a user interface display that can be surfaced for the user so the user can resolve the conflict. One example of this is illustrated in FIG. 14.

Figure 14:
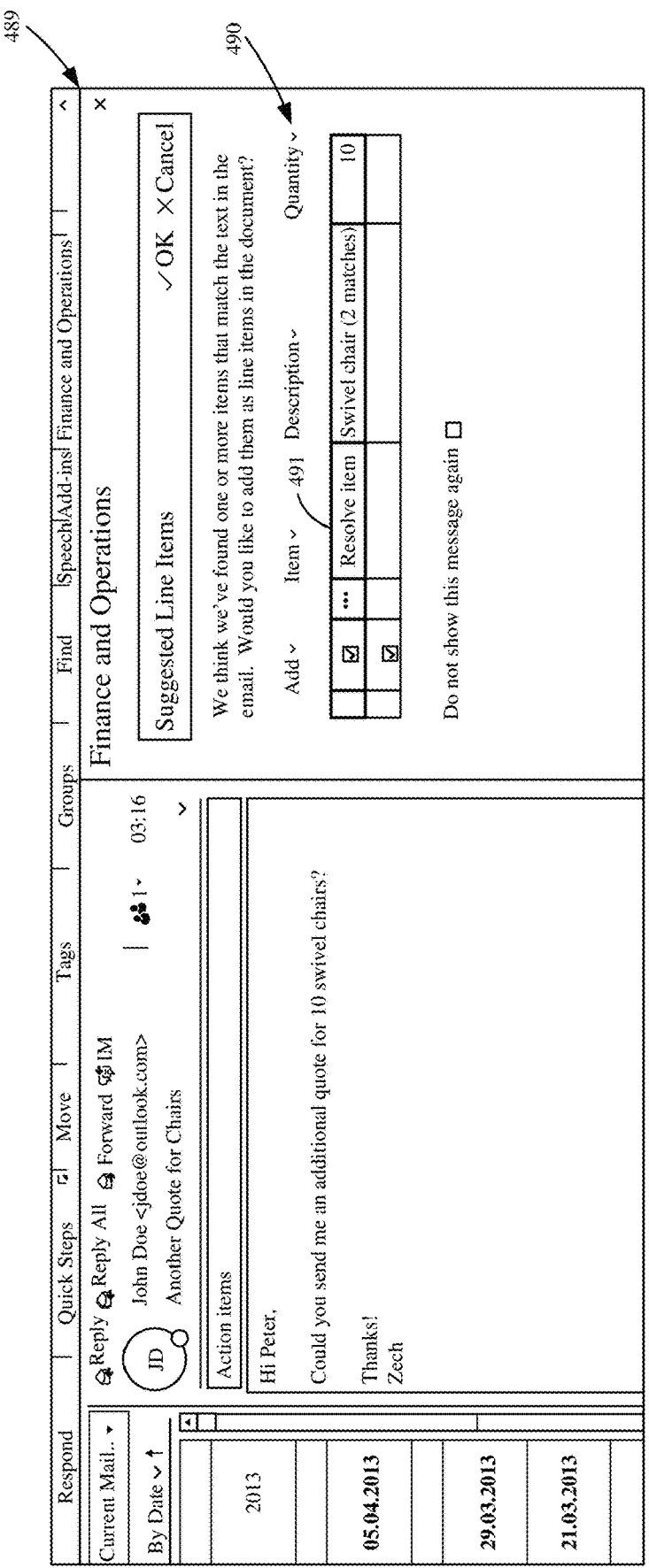
FIGS. 14-16 show examples of user interface displays.
Figure 15:
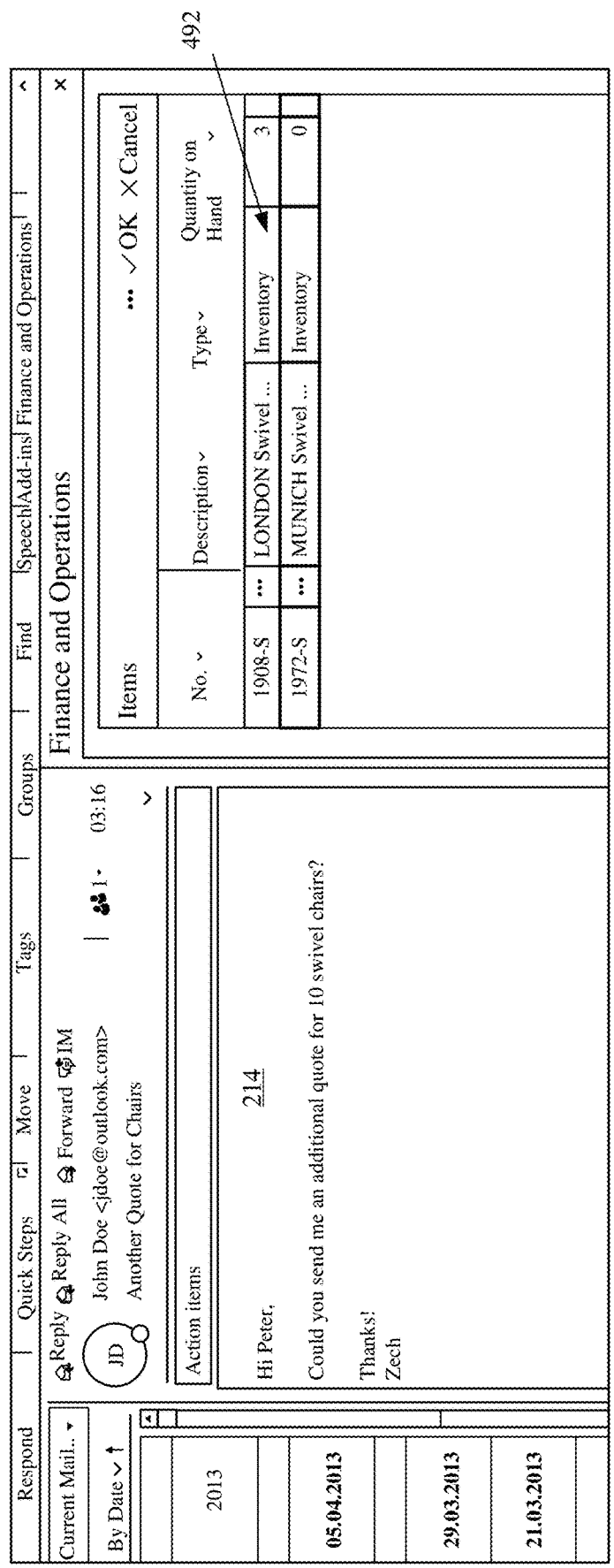
Figure 16:
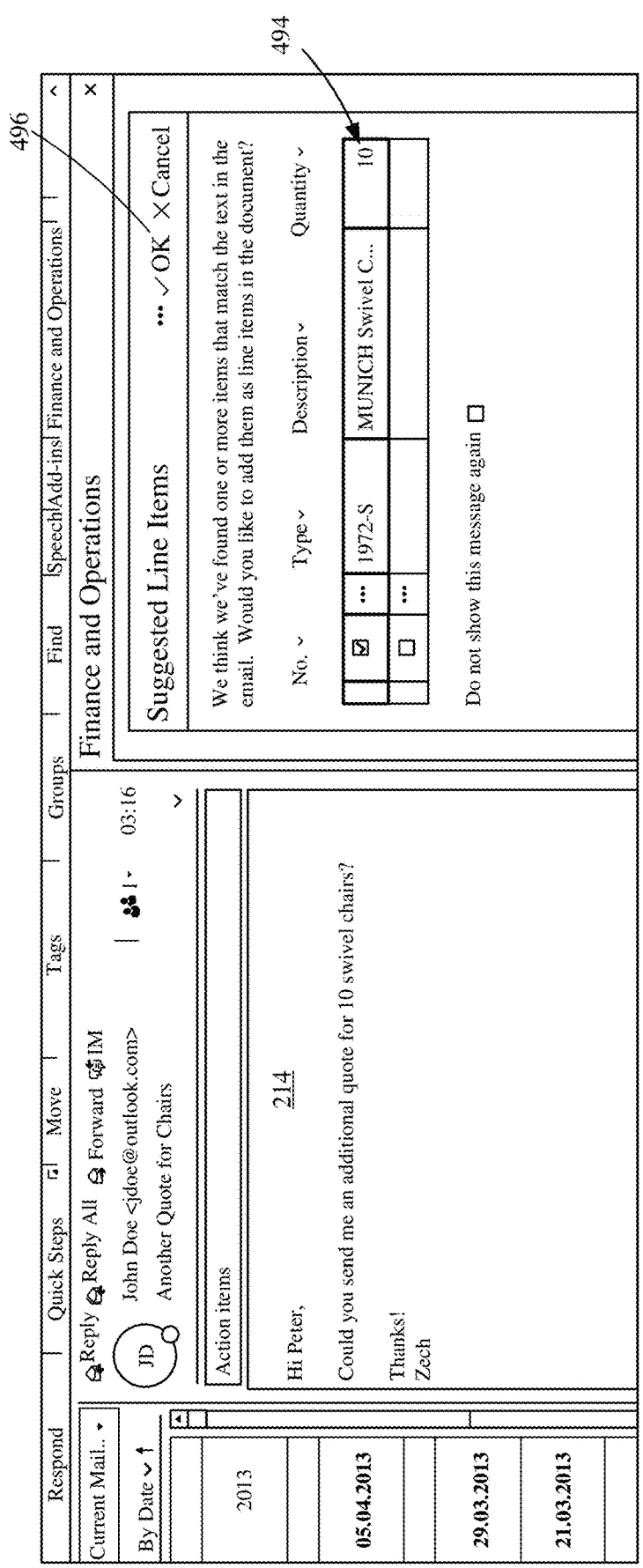

Some items in FIG. 14 are similar to those shown in FIGS. 3A-3C above, and they are similarly numbered. However, FIG. 14 shows that the user interface display 489 includes a suggested items display portion 490, but it includes a conflict identifier 491 indicating that two swivel chair data records match text in the search phrase identified in the e-mail message. When the user actuates item 491, user interface generation logic 492 illustratively generates a user interface display such as that shown in FIG. 15. It can now be seen (in FIG. 15) that a conflict resolution display portion 492 displays the two matching records, and they are displayed as actuatable display elements so that one of them can be selected by the user. FIG. 16 shows that the user has actuated one of the suggested line items on display portion 492. In FIG. 16, the display shows the suggested line items portion 494, in which the "Munich swivel chair" matching record has been selected by the user for inclusion in the document. When the user is satisfied, then the user can actuate the "OK" actuator 496. Processing then continues as discussed above with respect to the other examples.

It can thus be seen that the present description greatly enhances the operation of the computing system itself. Because extension logic 126 is included within e-mail system 102, it can interact with document processing computing system 110 to automatically obtain a pre-populated document for interaction by user 116. This reduces computing overhead in that, without the system, user 116 would need to access the document processing computing system 110 himself, or herself, create the document, populate the document and then send it through e-mail computing system 102. This would require additional bandwidth because there would likely need to be additional accesses to computing system 110. User 116 would need to search the searchable data 188, using search strings that the user, himself or herself, would generate. This would include more computer processing and bandwidth overhead because those search strings would need to be generated and submitted by user 116. Instead, the present description describes a system where the body of an e-mail message, itself, is obtained by natural language processing system 112 and search strings are automatically identified, within document processing computing system 110, and they are launched against data store 164 to identify items for inclusion in the document. Because these are all done within computing system 110, there is no need for extra processing and bandwidth overhead that would be consumed by user 116 repeatedly generating the search strings and repeatedly accessing computing system 102 to launch those searches, receive the search results, and only then populate the document.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 17:
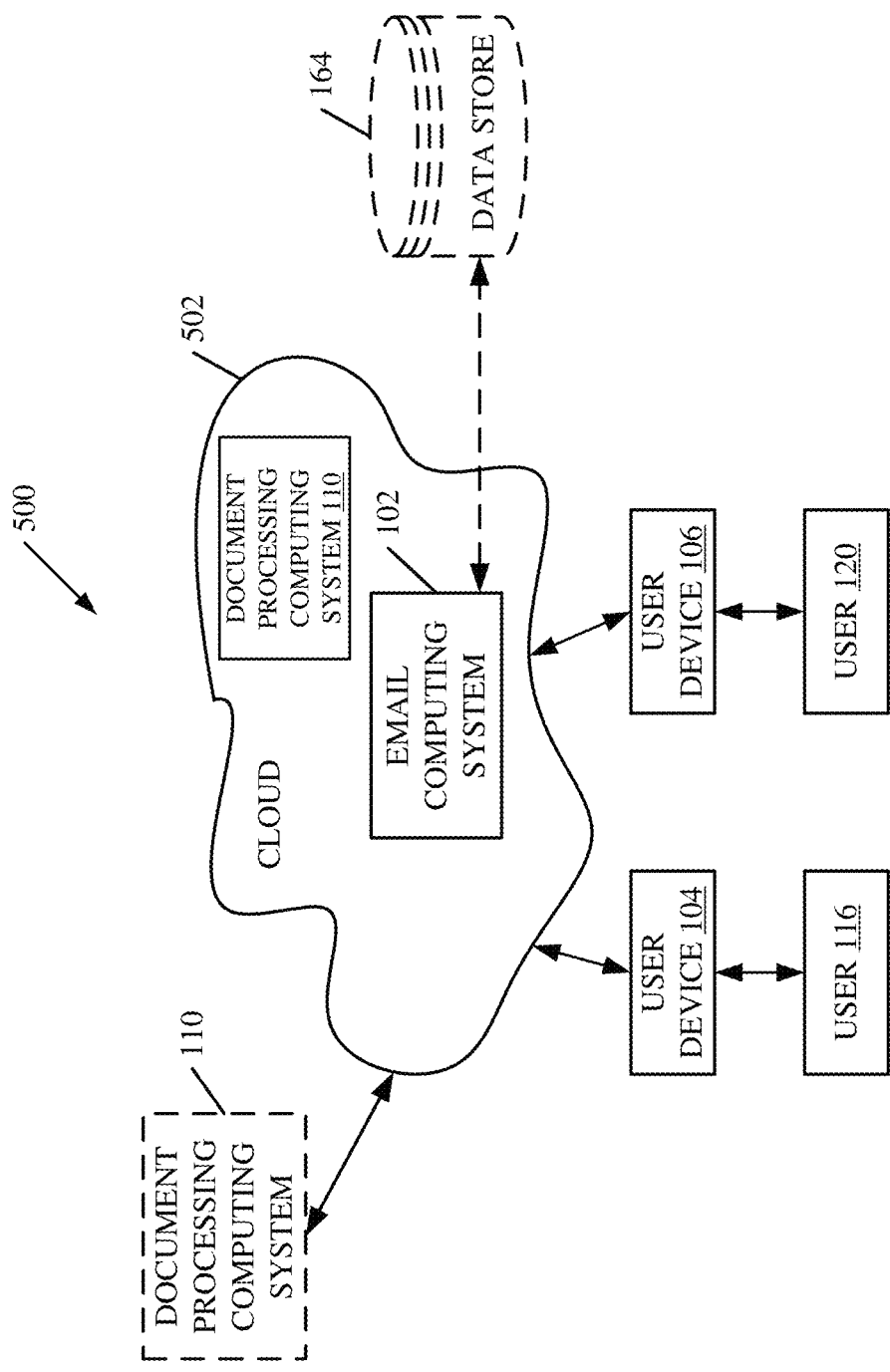
FIG. 17 is a block diagram showing one example of the architecture shown in FIG. 1, disposed in a cloud computing architecture.

FIG. 17 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 17, some items are similar to those shown in FIG. 1 and they are similarly numbered. FIG. 17 specifically shows that computing systems 102 and 110 can be located in cloud 502 (which can be public, private, or a combination where portions are public while others are private). Therefore, users 116 and 120 uses user devices 104 and 106 to access those systems through cloud 502.

FIG. 17 also depicts another example of a cloud architecture. FIG. 17 shows that it is also contemplated that some elements can be disposed in cloud 502 while others are not. By way of example, system 110 can be disposed outside of cloud 502, and accessed through cloud 502. In another example, data store 164 (or other items) can be outside of cloud 502. Regardless of where they are located, they can be accessed directly by device 104 and 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 18:
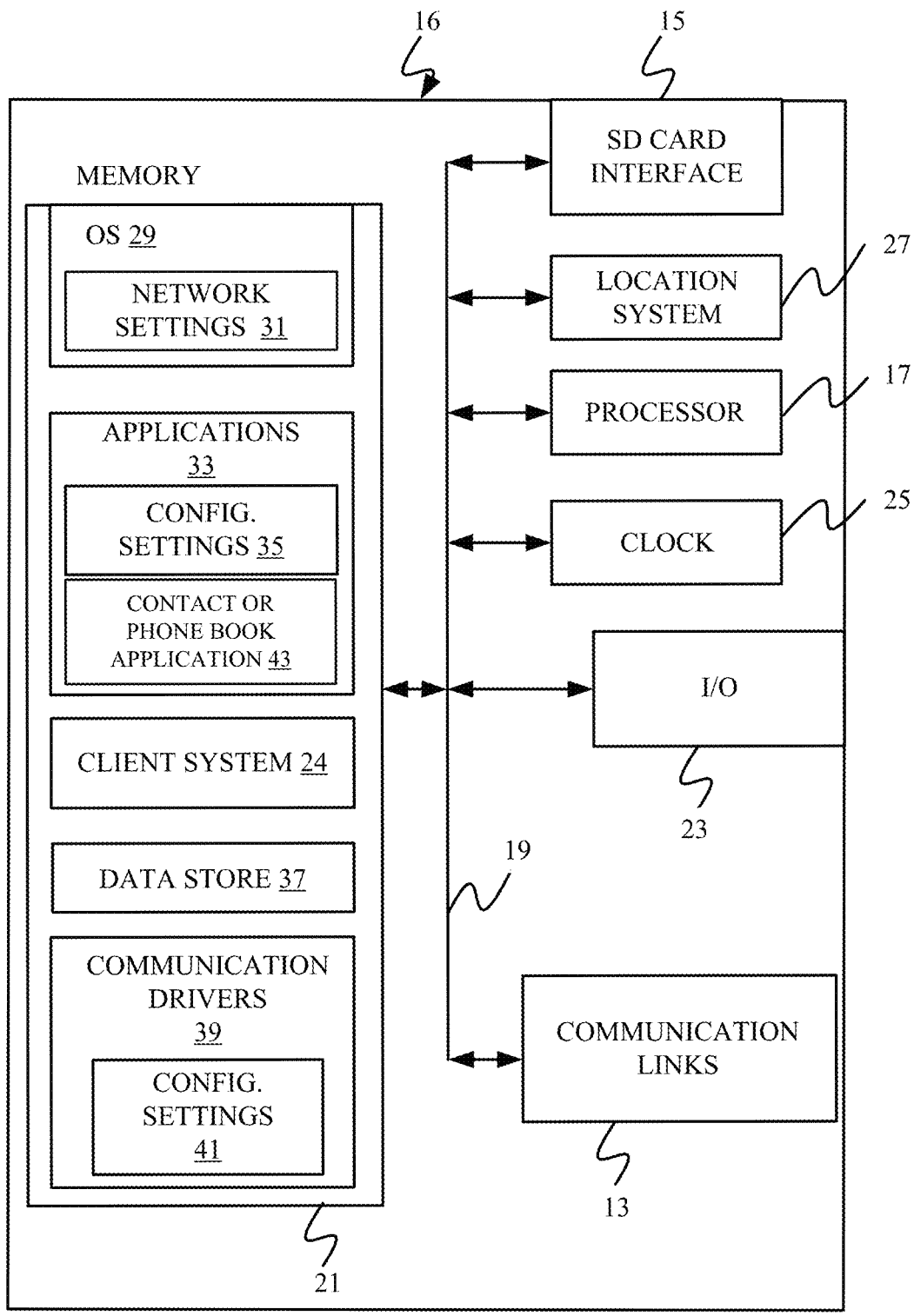
FIGS. 18-20 show examples of mobile devices that can be used in the architectures shown in the previous figures.
Figure 19:
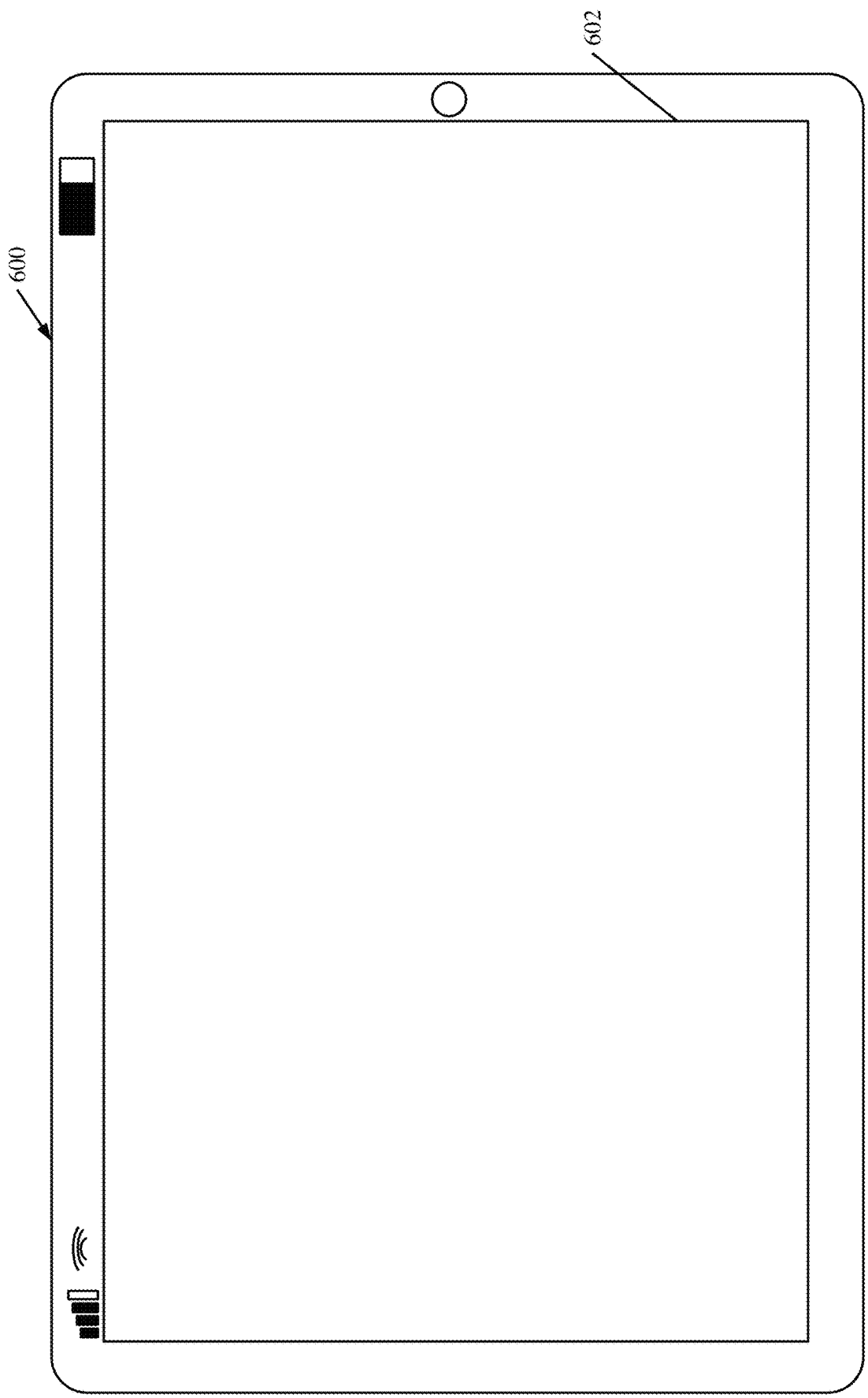
Figure 20:
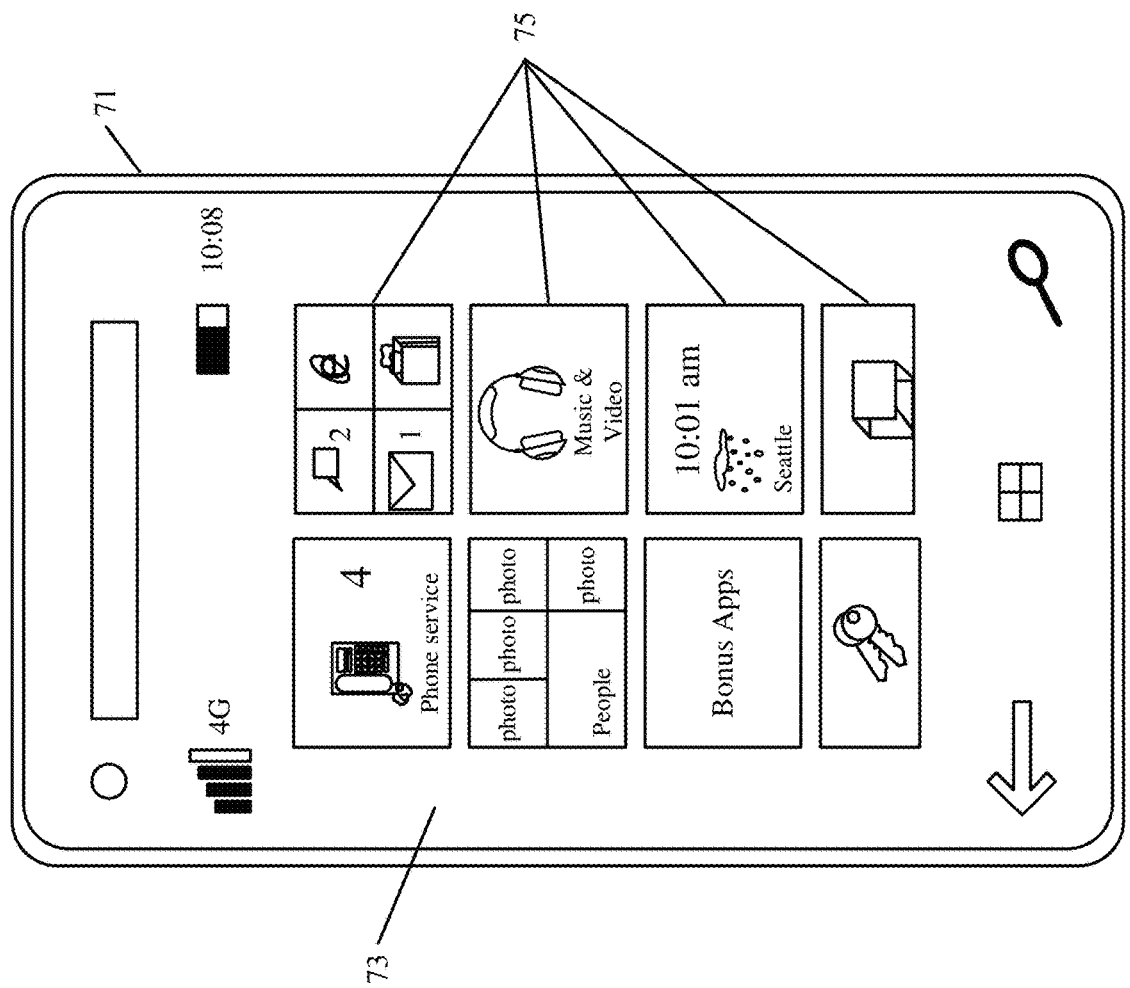

FIG. 18 is a simplified block diagram of one illustrative example of a handheld or mobile computing device that can be used as a user's or client's hand held device 16, in which the present system (or parts of it) can be deployed. FIGS. 19-20 are examples of handheld or mobile devices.

FIG. 18 provides a general block diagram of the components of a client device 16 that can run components computing systems 102 and/or 110 or user device 104, 106 or system 116 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 19 shows one example in which device 16 is a tablet computer 600. In FIG. 19, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 20 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 21:
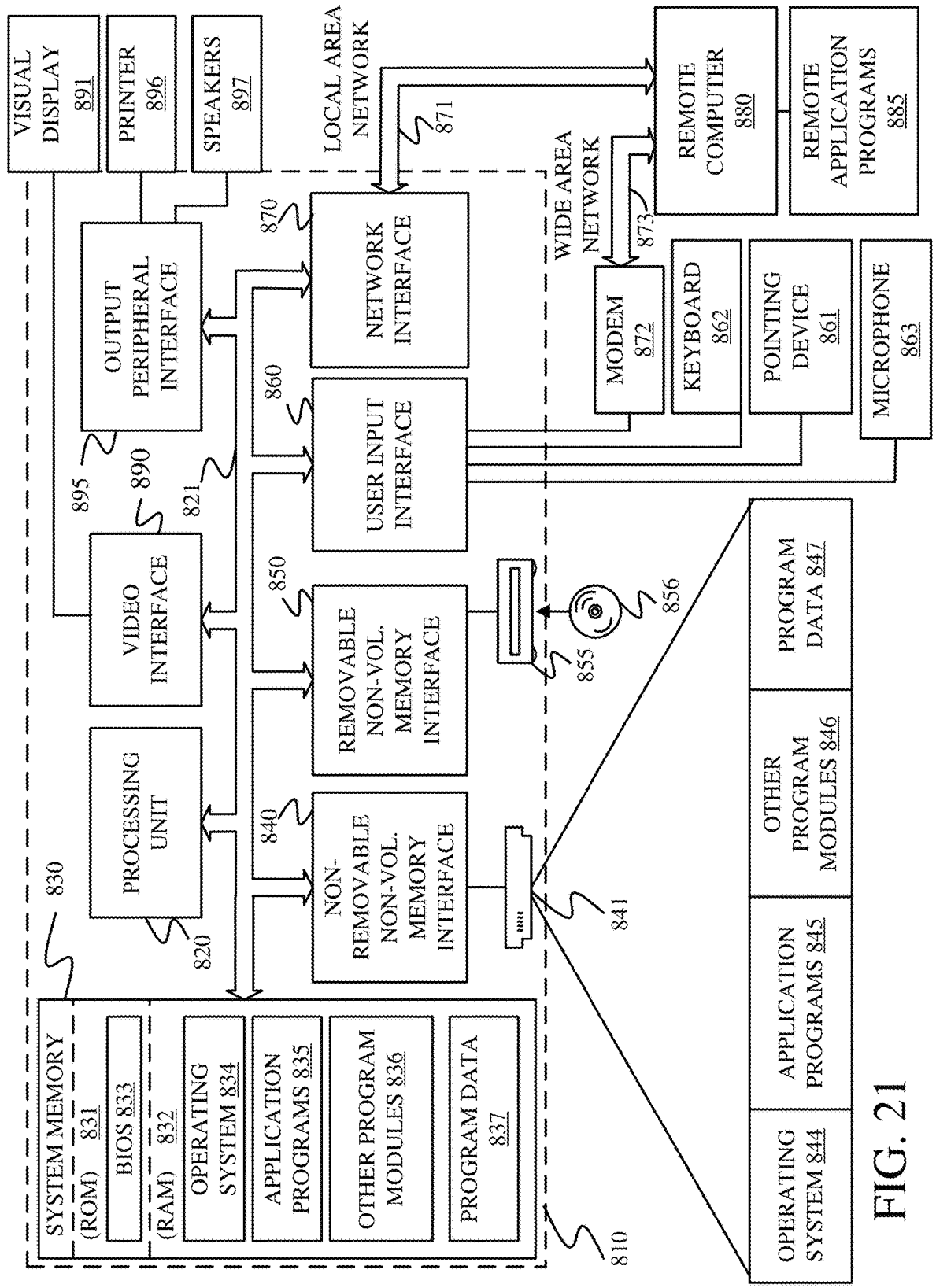
FIG. 21 is a block diagram showing one example of a computing environment that can be used in the architectures shown in the previous figures.

FIG. 21 is one example of a computing environment in which architecture 100, or parts of it, (for example) can be deployed. With reference to FIG. 21, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 21.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 21 illustrates operating system 834, application programs 835, other program modules 836, and program data 837.

The computer 810 may also include other removable/non-removable volatile/nonvolatile computer storage media. By way of example only, FIG. 21 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 21, provide storage of computer readable instructions, data structures, program modules and other data for the computer 810. In FIG. 21, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 21 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 21 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

extension interaction logic that interacts with extension logic in an electronic mail (e-mail) system to obtain a body of an e-mail message, the body including a plurality of elements;

quantity identifier logic that identifies a quantity reference in the body of the e-mail message;

search string generator logic that generates a search string based on elements in the body of the e-mail message within a threshold distance of the identified quantity reference;

a search system that searches a data store to identify a matching data store record corresponding to an item, based on the search string; and a document generation system that creates a document and populates the document with the item corresponding to the matching data store record, to obtain a populated document, the extension interaction logic sending the populated document to the e-mail system.

Example 2 is the computing system of any or all previous examples and further comprising:

parsing logic configured to identify a first string of words in the e-mail body on a first side of the quantity reference, the search string generator generating a first plurality of different search strings based on the first string of words.

Example 3 is the computing system of any or all previous examples wherein the search system searches the data store to identify any matching data store records based on the first plurality of different search strings.

Example 4 is the computing system of any or all previous examples wherein the search system identifies a first match between a first matched search string, of the first plurality of different search strings, and a first matched data store record, and identifies a second match between a second matched search string, of the first plurality of different search strings, and a second matched data store record, and wherein the search system comprises:

weighting logic configured to weight each of the first and second matches to identify first and second weighted matches.

Example 5 is the computing system of any or all previous examples wherein the weighting logic is configured to weight the first match based on a number of words matched between the first matched search string and the first matched data store record and to weight the second match based on a number of words matched between the second matched search string and the second matched data store record.

Example 6 is the computing system of any or all previous examples wherein the weighting logic is configured to weight the first match based on which particular words match between the first matched search string and the first matched data store record and to weight the second match based on which particular words match between the second matched search string and the second matched data store record.

Example 7 is the computing system of any or all previous examples wherein the document generation system is configured to populate the document with an item corresponding to one of the first and second matched data store records based on the first and second weighted matches.

Example 8 is the computing system of any or all previous examples and further comprising:

recommendation logic configured to generate a recommendation including the item corresponding to the matched data store record and to send the recommendation to the e-mail system for approval.

Example 9 is the computing system of any or all previous examples wherein the extension interaction logic is configured to receive an approval indication from the extension logic, the approval indication identifying whether the item in the recommendation is approved for inclusion in the document.

Example 10 is the computing system of any or all previous examples wherein the document generation system is configured to populate the document with the item if the item is indicated by the approval indication as being approved for inclusion in the document.

Example 11 is the computing system of any or all previous examples wherein the parsing logic is configured to identify a second string of words in the e-mail body on a second side of the quantity reference, the search string generator generating a second plurality of different search strings based on the second string of words.

Example 12 is the computing system of any or all previous examples wherein the search system searches the data store to identify any matching data store records based on the second plurality of different search strings.

Example 13 is the computing system of any or all previous examples wherein the search string generator logic is configured to generate a search string using words in the body of the e-mail message within a threshold number of words of the identified quantity reference.

Example 14 is a computer implemented method, comprising:

obtaining a body of an e-mail message, from an e-mail system, the body including a plurality of textual elements;

identifying a quantity reference in the body of the e-mail message;

generating a search string based on elements in the body of the e-mail message within a threshold distance of the identified quantity reference;

searching a data store to identify a matching data store record corresponding to an item, based on the search string; and creating a document;

populating the document with the item corresponding to the matching data store record, to obtain a populated document; and sending the populated document to the e-mail system.

Example 15 is the computer implemented method of any or all previous examples and further comprising:

identifying a first string of textual elements in the e-mail body on a first side of the quantity reference, the search string generator generating a first plurality of different search strings based on the first string of textual elements, wherein identifying a matching data store record comprises:

identifying a first match between a first matched search string, of the first plurality of different search strings, and a first matched data store record;

identifying a second match between a second matched search string, of the first plurality of different search strings, and a second matched data store record;

weighting each of the first and second matches to identify first and second weighted matches;

identifying a highest weighted match of the first and second weighted matches, and wherein populating the document comprises populating the document with an item corresponding to the highest weighted match.

Example 16 is the computer implemented method of any or all previous examples and further comprising:

generating a recommendation including the item corresponding to the matching data store record;

sending the recommendation to the e-mail system for approval; and receiving an approval indication identifying whether the item in the recommendation is approved for inclusion in the document.

Example 17 is the computer implemented method of any or all previous examples wherein populating the document comprises:

populating the document with the item if the item is indicated by the approval indication as being approved for inclusion in the document.

Example 18 is the computer implemented method of any or all previous examples and further comprising:

identifying a second string of textual elements in the e-mail body on a second side of the quantity reference; and generating a second plurality of different search strings based on the second string of textual elements, and wherein searching includes searching the data store to identify any matching records based on the second plurality of different search strings.

Example 19 is the computer implemented method of any or all previous examples wherein generating a search string comprises:

generating a search string using words in the body of the e-mail message within a threshold number of words of the identified quantity reference.

Example 20 is a computing system, comprising:

extension interaction logic that interacts with extension logic in an electronic mail (e-mail) system to obtain a body of an e-mail message, the body including a plurality of textual elements;

quantity identifier logic that identifies a quantity reference in the body of the e-mail message;

parsing logic configured to identify a first string of textual elements in the e-mail body on a first side of the quantity reference, within a threshold distance of the identified quantity reference;

search string generator logic that generates a first plurality of different search strings based on the first string of textual elements;

a search system that searches a data store to identify a first match between a first matched search string, of the first plurality of different search strings, and a first matched data store record corresponding to a first item, and identifies a second match between a second matched search string, of the first plurality of different search strings, and a second matched data store record corresponding to a second item;

weighting logic configured to weight each of the first and second matches to identify first and second weighted matches and to identify a highest weighted match; and a document generation system that creates a document and populates the document with the item corresponding to a highest matched data store record, of the first and second matched data store records, in the highest weighted match, to obtain a populated document, the extension interaction logic sending the populated document to the e-mail system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
   interact with an extension logic in an electronic mail (e-mail) system to obtain an e-mail body of an e-mail message, the e-mail body including a plurality of elements;
   identify a quantity reference in the e-mail body;
   in response to identifying the quantity reference, identify a string of words in the e-mail body on a first side of the identified quantity reference and within a threshold number of words of the identified quantity reference;
   generate a plurality of different search strings based on the string of words in the e-mail body;
   search a data store to identify a matching data store record corresponding to an item, based on the plurality of different search strings;
   create a document and populate the document with the item corresponding to the matching data store record, to obtain a populated document; and
   send the populated document to the e-mail system.

2. The computing system of claim 1 wherein the instructions cause the computing system to:
   identify a first match between a first matched search string, of the plurality of different search strings, and a first matched data store record;
   identify a second match between a second matched search string, of the plurality of different search strings, and a second matched data store record; and
   weight each of the first and second matches to identify first and second weighted matches.

3. The computing system of claim 2 wherein the instructions cause the computing system to weight the first match based on a number of words matched between the first matched search string and the first matched data store record and to weight the second match based on a number of words matched between the second matched search string and the second matched data store record.

4. The computing system of claim 2 wherein the instructions cause the computing system to weight the first match based on which particular words match between the first matched search string and the first matched data store record and to weight the second match based on which particular words match between the second matched search string and the second matched data store record.

5. The computing system of claim 2 wherein the instructions cause the computing system to populate the document with an item corresponding to one of the first and second matched data store records based on the first and second weighted matches.

6. The computing system of claim 1 wherein the instructions cause the computing system to:
   generate a recommendation including the item corresponding to the matched data store record and to send the recommendation to the e-mail system for approval.

7. The computing system of claim 6 wherein the instructions cause the computing system to:
   receive an approval indication from the extension logic and to identify whether the item in the recommendation is approved for inclusion in the document; and
   populate the document with the item if the item is indicated by the approval indication as being approved for inclusion in the document.

8. The computing system of claim 1 wherein the string of words comprises a first string of words, the plurality of different search strings comprises a first plurality of different search strings, and the instructions cause the computing system to:
   identify a second string of words in the e-mail body on a second side of the quantity reference;
   generate a second plurality of different search strings based on the second string of words; and
   search the data store to identify any matching data store records based on the second plurality of different search strings.

9. The computing system of claim 1, wherein the e-mail system is configured to:
   generate a user interface display comprising:
   an email display pane that displays at least a portion of the e-mail message, and
   a document display pane that displays a representation of the populated document and includes a send actuator that is actuatable to send the populated document to one or more recipients.

10. The computing system of claim 9, wherein the email message is received from a sending user, and the one or more recipients includes the sending user, and wherein the e-mail system is configured to:
  in response to an indication of user actuation of the send actuator, send the populated document to the sending user.

11. The computing system of claim 10 wherein the instructions cause the computing system to:
  search the data store to identify a set of matching data store records corresponding to a set of items based on the plurality of different search strings, and
  wherein the document display pane includes a suggested item display portion including:
    a set of suggested item display elements, each suggested item display element representing one of the items corresponding to a matching data store record identified based on the search string; and
    an add actuator that is actuatable to add one or more of the items to the document.

12. A computer implemented method, comprising:
  obtaining a body of an e-mail message, from an e-mail system, the body including a plurality of textual elements;
  identifying a quantity reference in the body of the e-mail message;
  in response to identifying the quantity reference,
    automatically identifying elements in the body of the e-mail message within a threshold distance of the identified quantity reference,
    automatically generating a search string based on the identified elements, and
    automatically searching a data store, based on the search string, to identify a matching data store record corresponding to an item; and
  creating a document;
  populating the document with the item corresponding to the matching data store record, to obtain a populated document; and
  sending the populated document to the e-mail system.

13. The computer implemented method of claim 12 and further comprising:
  identifying a first string of textual elements in the e-mail body on a first side of the quantity reference, the search string generator generating a first plurality of different search strings based on the first string of textual elements, wherein identifying a matching data store record comprises:
  identifying a first match between a first matched search string, of the first plurality of different search strings, and a first matched data store record;
  identifying a second match between a second matched search string, of the first plurality of different search strings, and a second matched data store record;
  weighting each of the first and second matches to identify first and second weighted matches;
  identifying a highest weighted match of the first and second weighted matches, and wherein populating the document comprises populating the document with an item corresponding to the highest weighted match.

14. The computer implemented method of claim 12 and further comprising:
  generating a user interface display comprising:
    an email display pane that displays at least a portion of the e-mail message, and a document display pane that displays a representation of the populated document and includes a send actuator that is actuatable to send the populated document to one or more recipients.

15. The computer implemented method of claim 14 wherein the email message is received from a sending user, and the one or more recipients includes the sending user, and further comprising:
  in response to an indication of user actuation of the send actuator, sending the populated document to the sending user.

16. The computer implemented method of claim 13 and further comprising:
  searching the data store to identify a set of matching data store records corresponding to a set of items based on the search string, and wherein the document display pane includes a suggested item display portion including:
    a set of suggested item display elements, each suggested item display element representing one of the items corresponding to a matching data store record identified based on the search string; and
    an add actuator that is actuatable to add one or more of the items to the document.

17. The computer implemented method of claim 12 wherein generating a search string comprises:
  generating a search string using words in the body of the e-mail message within a threshold number of words of the identified quantity reference.

18. A method performed by a computing system, the method comprising:
  identifying a quantity reference in a body of an electronic mail (e-mail) message;
  generating a search string based on elements in the body of the e-mail message within a threshold distance of the identified quantity reference;
  identifying, based on the search string, a set of matching data store records corresponding to a set of items;
  generating a user interface display comprising:
    an email display pane that displays at least a portion of the e-mail message, and
    a document display pane that includes a suggested item display portion including:
      a set of suggested item display elements, each suggested item display element representing one of the items corresponding to a matching data store record identified based on the search string; and
      an add actuator that is actuatable to populate the document with one or more of the items;
  displaying, in the document display pane, a representation of the populated document and a send actuator that is actuatable to send the populated document to one or more recipients; and
  sending, in response to user actuation of the send actuator, the populated document to one or more recipients.

* * * * *